US012568302B2

(12) United States Patent
Li et al.

(10) Patent No.: US 12,568,302 B2
(45) Date of Patent: Mar. 3, 2026

(54) METHOD AND ELECTRONIC DEVICE FOR SWITCHING FROM A FIRST CAMERA TO A SECOND CAMERA BASED ON A FOCUS CONDITION

(71) Applicant: Honor Device Co., Ltd., Shenzhen (CN)

(72) Inventors: Guangyuan Li, Shenzhen (CN); Li Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/686,672

(22) PCT Filed: May 4, 2023

(86) PCT No.: PCT/CN2023/092122
§ 371 (c)(1),
(2) Date: Feb. 26, 2024

(87) PCT Pub. No.: WO2023/231687
PCT Pub. Date: Dec. 7, 2023

(65) Prior Publication Data
US 2025/0142202 A1 May 1, 2025

(30) Foreign Application Priority Data
May 30, 2022 (CN) ........................ 202210605721.X

(51) Int. Cl.
*H04N 23/63* (2023.01)
*H04M 1/72403* (2021.01)
(Continued)

(52) U.S. Cl.
CPC ...... *H04N 23/632* (2023.01); *H04M 1/72403* (2021.01); *H04N 23/62* (2023.01);
(Continued)

(58) Field of Classification Search
CPC .... H04N 23/632; H04N 23/62; H04N 23/667; H04N 23/671; H04N 23/90; H04N 23/45;
(Continued)

(56) References Cited

U.S. PATENT DOCUMENTS

| | | |
|---|---|---|
| 12,010,408 B2 | 6/2024 | Feng et al. |
| 2011/0157456 A1 | 6/2011 | Hongu |

(Continued)

FOREIGN PATENT DOCUMENTS

| | | |
|---|---|---|
| CN | 102111551 A | 6/2011 |
| CN | 106197366 A | 12/2016 |

(Continued)

*Primary Examiner* — Kelly L Jerabek
(74) *Attorney, Agent, or Firm* — Slater Matsil, LLP

(57) ABSTRACT

This application provides a camera switching method and an electronic device, and relates to the field of terminal technologies. An electronic device receives a first operation of a user. In a scenario in which an actual photographing distance is less than a first value, the electronic device displays a first interface in response to the first operation, where the first interface is used to display an image frame collected by the first camera, and the first value is a minimum focusing distance of a first camera. When the electronic device determines that a first condition is met, the electronic device displays a second interface, where the second interface is a preview framing interface used by the electronic device for photographing.

20 Claims, 19 Drawing Sheets

| Obtain a first real-time parameter of a first camera during display of a first preview interface by a mobile phone, where the first real-time parameter is used to indicate a real-time photographing status of the first camera | S201 |
| When a focusing status in the first real-time parameter is that focusing fails, determine that a sum of a defocus value in the first real-time parameter and a second value indicated by a VCM code is less than a preset first threshold | S202 |
| The mobile phone determines to enable a SUPER MACRO function | S203 |

(51) Int. Cl.
    *H04N 23/62*         (2023.01)
    *H04N 23/667*     (2023.01)
    *H04N 23/67*       (2023.01)
    *H04N 23/90*       (2023.01)

(52) U.S. Cl.
    CPC ......... *H04N 23/667* (2023.01); *H04N 23/671* (2023.01); *H04N 23/90* (2023.01); *H04M 2250/52* (2013.01)

(58) Field of Classification Search
    CPC . H04N 23/631; H04N 23/67; H04M 1/72454; H04M 1/72403; H04M 2250/52
    See application file for complete search history.

(56)          References Cited

U.S. PATENT DOCUMENTS

| | | | |
|---|---|---|---|
| 2017/0208239 | A1 | 7/2017 | Chien et al. |
| 2021/0321043 | A1 | 10/2021 | Arora et al. |
| 2023/0224575 | A1 | 7/2023 | Chenchen et al. |
| 2024/0056683 | A1 | 2/2024 | Lin et al. |

FOREIGN PATENT DOCUMENTS

| | | |
|---|---|---|
| CN | 106506957 A | 3/2017 |
| CN | 110248081 A | 9/2019 |
| CN | 111654629 A | 9/2020 |
| CN | 112601008 A | 4/2021 |
| CN | 113099102 A | 7/2021 |
| CN | 113132620 A | 7/2021 |
| CN | 113556466 A | 10/2021 |
| EP | 2747413 A1 | 6/2014 |
| EP | 4030745 A1 | 7/2022 |
| JP | 2000231055 A | 8/2000 |
| JP | 2010217262 A | 9/2010 |
| JP | 2022006844 A | 1/2022 |
| WO | 2020073959 A1 | 4/2020 |
| WO | 2021000063 A1 | 1/2021 |
| WO | 2021185296 A1 | 9/2021 |

403

CONT. FROM FIG. 4A

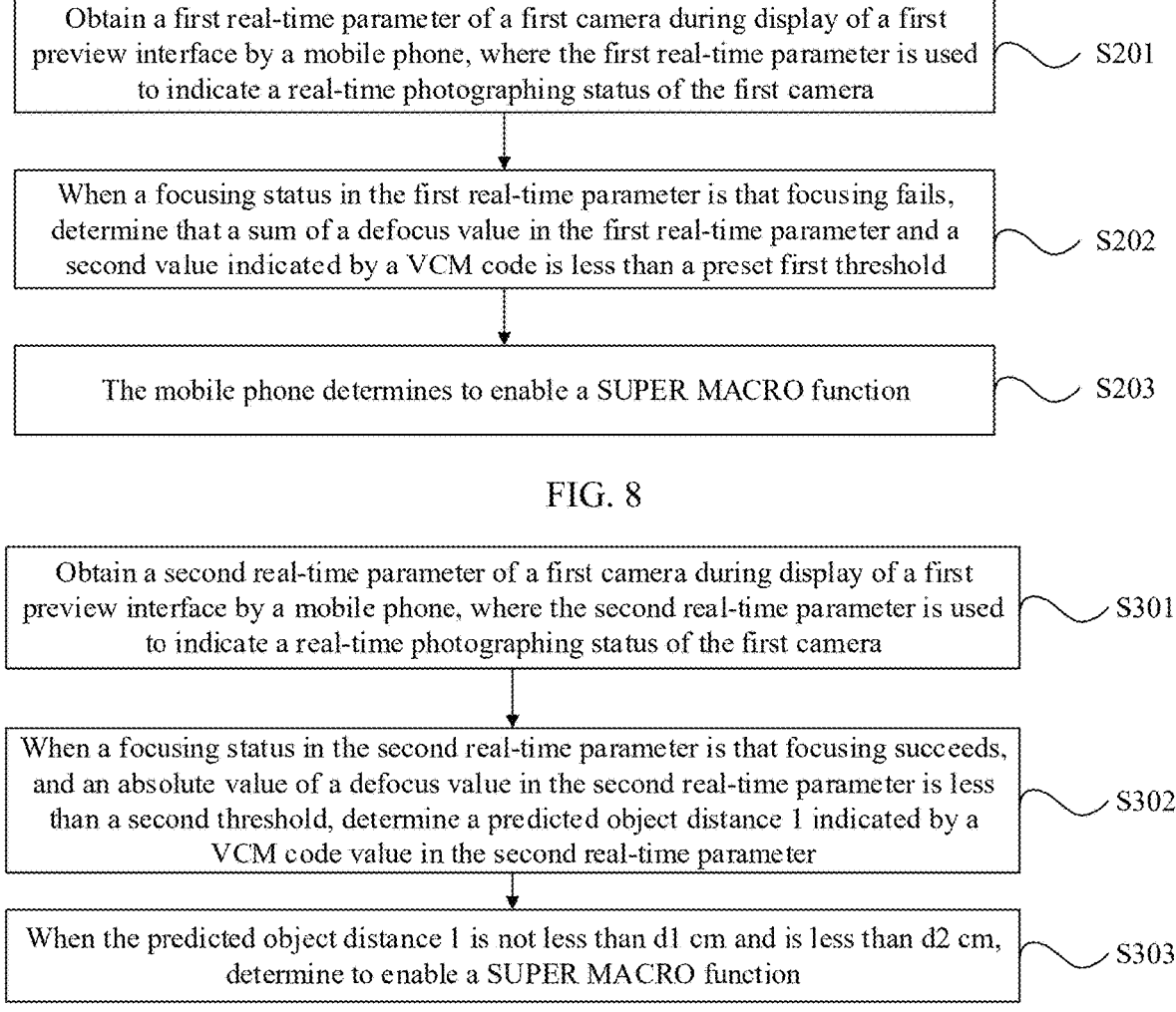

Obtain a first real-time parameter of a first camera during display of a first preview interface by a mobile phone, where the first real-time parameter is used to indicate a real-time photographing status of the first camera — S201

When a focusing status in the first real-time parameter is that focusing fails, determine that a sum of a defocus value in the first real-time parameter and a second value indicated by a VCM code is less than a preset first threshold — S202

The mobile phone determines to enable a SUPER MACRO function — S203

FIG. 8

Obtain a second real-time parameter of a first camera during display of a first preview interface by a mobile phone, where the second real-time parameter is used to indicate a real-time photographing status of the first camera — S301

When a focusing status in the second real-time parameter is that focusing succeeds, and an absolute value of a defocus value in the second real-time parameter is less than a second threshold, determine a predicted object distance 1 indicated by a VCM code value in the second real-time parameter — S302

When the predicted object distance 1 is not less than d1 cm and is less than d2 cm, determine to enable a SUPER MACRO function — S303

FIG. 9

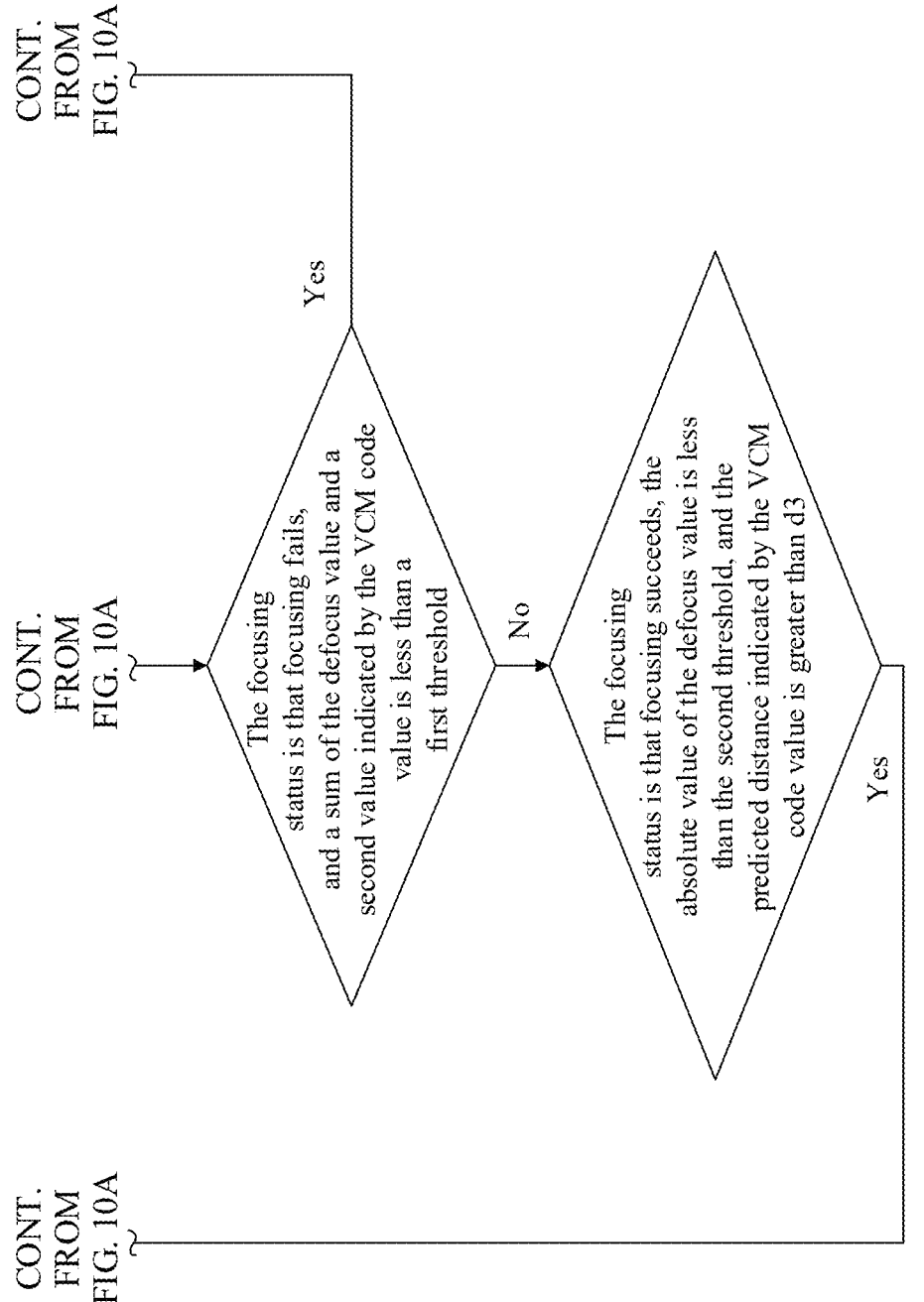

CONT.
FROM
FIG. 10A

CONT.
FROM
FIG. 10A

CONT.
FROM
FIG. 10A

Yes

The focusing status is that focusing fails, and a sum of the defocus value and a second value indicated by the VCM code value is less than a first threshold No The focusing status is that focusing succeeds, the absolute value of the defocus value is less than the second threshold, and the predicted distance indicated by the VCM code value is greater than d3

Yes

FIG. 10B

METHOD AND ELECTRONIC DEVICE FOR SWITCHING FROM A FIRST CAMERA TO A SECOND CAMERA BASED ON A FOCUS CONDITION

CROSS-REFERENCE TO RELATED APPLICATIONS

This application is a national stage of International Application No. PCT/CN2023/092122, filed on May 4, 2023, which claims priority to Chinese Patent Application No. 202210605721.X, filed on May 30, 2022, both of which are incorporated herein by reference in their entireties.

TECHNICAL FIELD

This application relates to the field of terminal technologies, and in particular, to a camera switching method and an electronic device.

BACKGROUND

With the development of electronic technologies, electronic devices such as a mobile phone and a tablet computer are usually provided with a plurality of cameras such as a main camera and an ultra-wide-angle camera. The main camera and the ultra-wide-angle camera are applicable to different photographing distances (distances between a lens and a photographed object). Generally, the main camera is applicable to photographing at a conventional distance, and the ultra-wide-angle camera is applicable to photographing at a short distance. In a related technology, a ranging component (for example, an infrared ranging sensor) needs to be separately configured for the camera of the electronic device, so that during enabling of a camera application, the electronic device can automatically switch between the main camera and the ultra-wide-angle camera as the photographing distance between the photographed object and the lens changes.

However, separately configuring the ranging component for the camera undoubtedly increases hardware costs of the electronic device. In addition, an electronic device having no ranging component or having a ranging component that is shielded by mistake cannot automatically switch between the main camera and the ultra-wide-angle camera as the photographing distance changes.

SUMMARY

Embodiments of this application provide a camera switching method and an electronic device, to automatically switch, without relying on a ranging component, between different cameras as a photographing distance changes, thereby improving intelligence of photographing by an electronic device.

To achieve the foregoing objectives, the following technical solutions are used in embodiments of this application:

According to a first aspect, an embodiment of this application provides a camera switching method, applied to an electronic device. The electronic device includes a first camera and a second camera, and the method includes: The electronic device receives a first operation of a user; in a scenario in which a photographing distance between the electronic device and a photographed object is less than a first value, the electronic device displays a first interface in response to the first operation, where the first interface is a preview framing interface used by the electronic device for photographing, the first interface is used to display an image frame captured by the first camera, and the first value is a minimum focusing distance of the first camera; and when the electronic device determines that a first condition is met, the electronic device displays a second interface, where the second interface is a preview framing interface used by the electronic device for photographing, the second interface is used to display an image frame captured by the second camera, and a minimum focusing distance of the second camera is less than the first value. The first condition includes: a focusing status of the first camera is that focusing fails, and a sum of a defocus value of the first camera and a corresponding second value is less than a preset first threshold, where the second value is used to indicate a focusing adjustment location of a lens in the first camera.

In the foregoing embodiment, the electronic device may identify, based on a focusing condition and a defocusing condition of the first camera, a photographing scene in which a photographing distance currently corresponding to the electronic device is less than the minimum focusing distance (also referred to as a short focus) of the first camera. The electronic device may trigger, based on the identified scene, switching to enable the second camera (for example, an ultra-wide-angle camera), and send, for display, the image frame captured by the second camera. In other words, a feature that a short focus of the second camera is less than the first value is used to ensure that the electronic device can display a clear photographing picture in this scenario, and automatically switch between different cameras without relying on a ranging component, thereby improving intelligence of photographing by the electronic device.

In some embodiments, the method further includes: determining, during display of the second interface by the electronic device, that a second condition is met, where the second condition includes: the focusing status of the first camera is that focusing succeeds, and an absolute defocus value of the first camera is less than a preset second threshold; determining, by the electronic device, a predicted object distance corresponding to a voice coil motor VCM code of the first camera; and when the predicted object distance is not less than the first value and is less than a third value, continuing, by the electronic device, to display the second interface, where the third value is a preset value.

In the foregoing embodiment, the electronic device may estimate a current photographing distance based on the VCM code. The estimation process does not require the use of a ranging component. In addition, the electronic device may also determine, by determining whether the second condition is met, whether the predicted object distance indicated by the VCM code is reliable, thereby improving accuracy of identifying a photographing distance.

In some embodiments, the method further includes: determining, during display of the second interface by the electronic device, that a second condition is met, where the second condition includes: the focusing status of the first camera is that focusing succeeds, and an absolute defocus value of the first camera is less than a preset second threshold; determining, by the electronic device, a predicted object distance corresponding to a VCM code of the first camera; and when the predicted object distance is greater than a third value, switching, by the electronic device, to display the first interface, where the third value is a preset value.

In some embodiments, after the electronic device switches to display the first interface, the method further includes: The electronic device disables the second camera.

In the foregoing embodiment, the electronic device may disable the second camera after stably displaying several image frames captured by the first camera, thereby reducing system energy consumption of the device.

In some embodiments, the method further includes: determining, during display of the first interface by the electronic device, that the second condition is met; determining, by the electronic device, the predicted object distance corresponding to the VCM code of the first camera; and when the predicted object distance is not less than a fourth value and is less than the third value, continuing, by the electronic device, to display the first interface, where the fourth value is a preset value greater than the first value.

In some embodiments, the method further includes: determining, during display of the first interface by the electronic device, that the second condition is met; determining, by the electronic device, the predicted object distance corresponding to the VCM code of the first camera; and when the predicted object distance is less than the fourth value, switching, by the electronic device, to display the second interface.

In some embodiments, before the second interface is displayed, the method further includes: The electronic device collects ambient lighting information; and the electronic device determines that the ambient lighting information is greater than a preset dark light threshold.

In the foregoing embodiment the second camera is prevented from being enabled by mistake to send, based on the ambient lighting information, for display, the image frame captured by the second camera.

In some embodiments, the second interface includes a first identifier, the first identifier is used to remind that an image frame in the second interface is captured by the second camera, and the method further includes: During display of the second interface, the electronic device receives a second operation performed by the user on the first identifier; and the electronic device switches, in response to the second operation, to display the first interface.

In some embodiments, the method further includes: determining, during display of the second interface by the electronic device, that a third condition is not met, where the third condition includes: the focusing status of the first camera is that focusing succeeds, an absolute defocus value of the first camera is less than a preset second threshold, and a predicted object distance corresponding to a VCM code of the first camera is less than a third value, where the third value is a preset value; determining, by the electronic device, that a fourth condition is met, where the fourth condition includes: a focusing status of the second camera is that focusing succeeds, an absolute defocus value of the second camera is less than the preset second threshold, and a predicted object distance corresponding to a VCM code of the second camera is less than the third value; and continuing, by the electronic device, to display the second interface.

In some embodiments, before the electronic device determines that the fourth condition is met, the method further includes: The electronic device determines that the VCM code of the second camera is trustworthy, where a case in which the VCM code of the second camera is trustworthy includes any one of the following: the second camera is pre-marked with a trusted identifier; and module information of the second camera indicates that the second camera is not a fixed-focus module and is not an open-loop module.

In the foregoing embodiment, VCM codes of a plurality of cameras participate in determining a predicted object distance, thereby improving accuracy of the obtained predicted distance.

In some embodiments, before the electronic device displays the second interface, the method further includes: The electronic device enables the second camera.

According to a second aspect, an embodiment of this application provides an electronic device. The electronic device includes one or more processors and a memory. The memory is coupled to the processor, and the memory is configured to store computer program code. The computer program code includes computer instructions. When the one or more processors execute the computer instructions, the one or more processors are configured to: receive a first operation of a user; in a scenario in which a photographing distance between the electronic device and a photographed object is less than a first value, display a first interface in response to the first operation, where the first interface is a preview framing interface used for photographing, the first interface is used to display an image frame captured by a first camera, and the first value is a minimum focusing distance of the first camera; and display a second interface when determining that a first condition is met, where the second interface is a preview framing interface used for photographing, the second interface is used to display an image frame captured by a second camera, and a minimum focusing distance of the second camera is less than the first value.

The first condition includes: a focusing status of the first camera is that focusing fails, and a sum of a defocus value of the first camera and a corresponding second value is less than a preset first threshold, where the second value is used to indicate a focus adjustment location of a lens in the first camera.

In some embodiments, the one or more processors are configured to: determine, during display of the second interface, that a second condition is met, where the second condition includes: the focusing status of the first camera is that focusing succeeds, and an absolute defocus value of the first camera is less than a preset second threshold; determine a predicted object distance corresponding to a voice coil motor VCM code of the first camera; and when the predicted object distance is not less than the first value and is less than a third value, continue to display the second interface, where the third value is a preset value.

In some embodiments, the one or more processors are configured to: determine, during display of the second interface, that a second condition is met, where the second condition includes: the focusing status of the first camera is that focusing succeeds, and an absolute defocus value of the first camera is less than a preset second threshold; determine a predicted object distance corresponding to a VCM code of the first camera; and when the predicted object distance is greater than a third value, switch to display the first interface, where the third value is a preset value.

In some embodiments, the one or more processors are configured to disable the second camera.

In some embodiments, the one or more processors are configured to: determine, during display of the first interface, that the second condition is met; determine the predicted object distance corresponding to the VCM code of the first camera; and when the predicted object distance is not less than a fourth value and is less than the third value, continue to display the first interface, where the fourth value is a preset value greater than the first value.

In some embodiments, the one or more processors are configured to: determine, during display of the first interface, that the second condition is met; determine the predicted object distance corresponding to the VCM code of the first camera; and when the predicted object distance is less than the fourth value, switch to display the second interface.

In some embodiments, the one or more processors are configured to: collect ambient lighting information before displaying the second interface; and determine that the ambient lighting information is greater than a preset dark light threshold.

In some embodiments, the second interface includes a first identifier, the first identifier is used to remind that an image frame in the second interface is captured by the second camera, and the one or more processors are configured to: during display of the second interface, receive a second operation performed by the user on the first identifier; and switch, in response to the second operation, to display the first interface.

In some embodiments, the one or more processors are configured to: determine, during display of the second interface, that a third condition is not met, where the third condition includes: the focusing status of the first camera is that focusing succeeds, an absolute defocus value of the first camera is less than a preset second threshold, and a predicted object distance corresponding to a VCM code of the first camera is less than a third value, where the third value is a preset value; determine that a fourth condition is met, where the fourth condition includes: a focusing status of the second camera is that focusing succeeds, an absolute defocus value of the second camera is less than the preset second threshold, and a predicted object distance corresponding to a VCM code of the second camera is less than the third value; and continue to display the second interface.

In some embodiments, the one or more processors are configured to: before determining that the fourth condition is met, determine that the VCM code of the second camera is trustworthy, where a case in which the VCM code of the second camera is trustworthy includes any one of the following: the second camera is pre-marked with a trusted identifier; and module information of the second camera indicates that the second camera is not a fixed-focus module and is not an open-loop module.

In some embodiments, the one or more processors are configured to enable the second camera before displaying the second interface.

According to a third aspect, an embodiment of this application provides a computer storage medium, including computer instructions. When the computer instructions are run on an electronic device, the electronic device is enabled to perform the method according to the first aspect and the possible embodiments of the first aspect.

According to a fourth aspect, this application provides a computer program product. When the computer program product is run on the foregoing electronic device, the electronic device is enabled to perform the method according to the first aspect and the possible embodiments of the first aspect.

It may be understood that, the electronic device, the computer-readable storage medium, and the computer program product provided in the foregoing aspects are all applied to the corresponding method provided above. Therefore, for beneficial effects that can be achieved by the electronic device, the computer-readable storage medium, and the computer program product, refer to beneficial effects in the corresponding method provided above. Details are not described herein again.

BRIEF DESCRIPTION OF THE DRAWINGS

FIG. 8 is a second flowchart of a camera switching method according to an embodiment of this application;

FIG. 9 is a third flowchart of a camera switching method according to an embodiment of this application;

FIG. 10A and FIG. 10B are a fourth flowchart of a camera switching method according to an embodiment of this application;

DETAILED DESCRIPTION OF ILLUSTRATIVE EMBODIMENTS

In the following, the terms "first" and "second" are used merely for the purpose of description, and shall not be construed as indicating or implying relative importance or implicitly indicating a quantity of indicated technical features. Therefore, features defined with "first" or "second" may explicitly or implicitly include one or more of the features. In the descriptions of the embodiments, unless otherwise stated, "a plurality of" means two or more.

Embodiments of this application provide a camera switching method. The method may be applied to an electronic device. The electronic device may include a plurality of cameras. Details are described in subsequent embodiments, and are not described herein.

For example, the electronic device in the embodiments of this application may be a mobile phone, a tablet computer, a smartwatch, a desktop computer, a laptop computer, a handheld computer, a notebook computer, an ultra-mobile personal computer (UMPC), a netbook, a cellular phone, a personal digital assistant PDA), an augmented reality (a AR)\virtual reality (VR) device, or the like that includes a plurality of cameras. A specific form of the electronic device is not specifically limited in the embodiments of this application.

Figure 1:
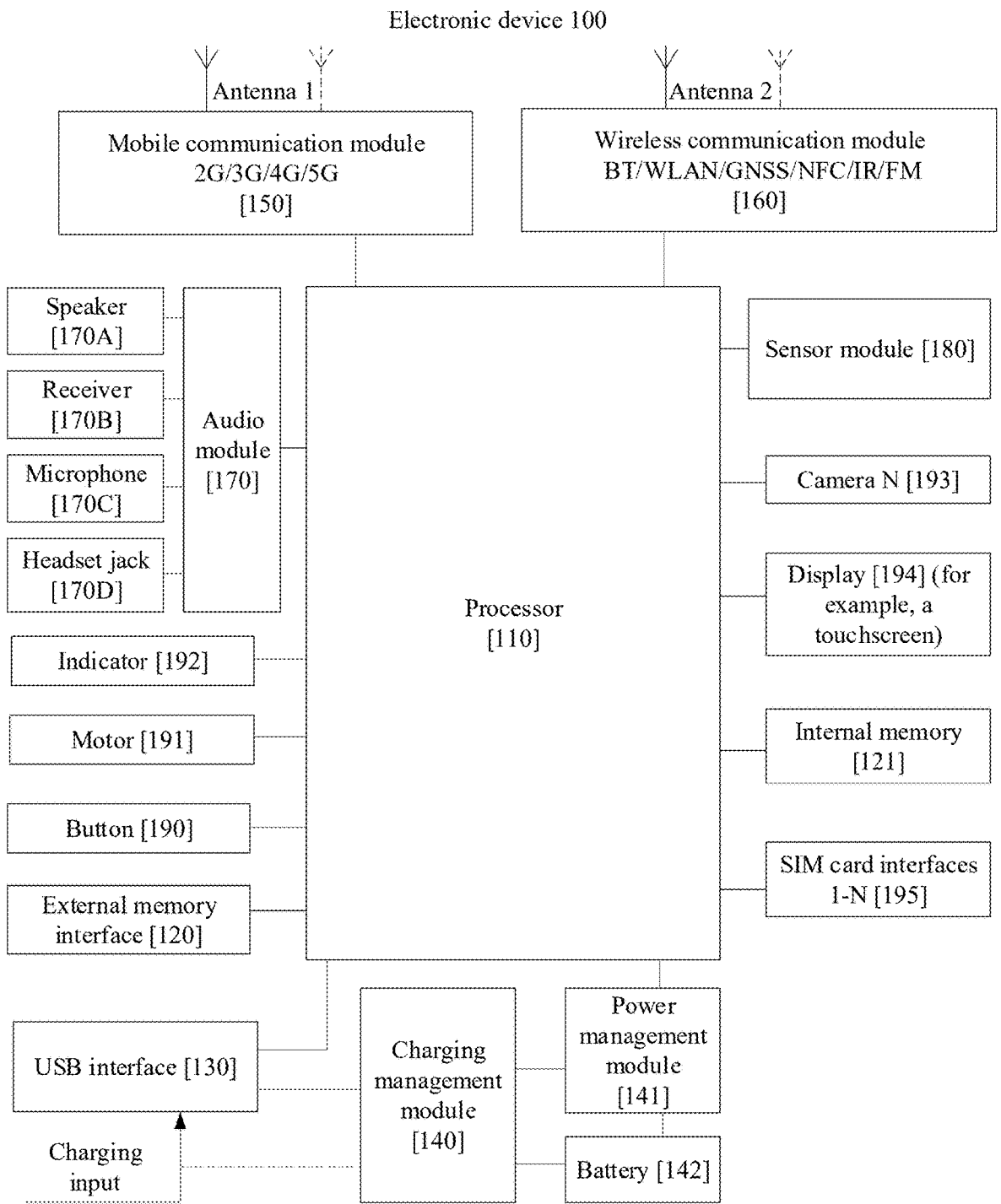
FIG. 1 is a schematic diagram of a structure of an electronic device according to an embodiment of this application.

The following describes implementations of the embodiments of this application in detail with reference to the accompanying drawings. FIG. 1 is a schematic diagram of a structure of an electronic device 100 according to an embodiment of this application. As shown in FIG. 1, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The sensor module 180 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure shown in this embodiment does not constitute a specific limitation on the electronic device 100. In some other embodiments, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and command center of the electronic device 100. The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules illustrated in this embodiment is merely an example for description, and does not constitute a limitation on the structure of the electronic device 100. In some other embodiments, the electronic device 100 may alternatively use an interface connection manner different from that in the foregoing embodiment, or use a combination of a plurality of interface connection manners.

The electronic device 100 implements a display function by using the GPU, the display 194, the application processor, and the like. The GPU is a microprocessor for image processing and is connected to the display 194 and the application processor. The GPU is configured to perform mathematical and geometric computing for graphics rendering. The processor 110 may include one or more GPUs, and the one or more GPUs execute program instructions to generate or change displayed information.

The display 194 is configured to display an image, a video, and the like. The display 194 includes a display panel. The display panel may be a liquid crystal display (LCD), an organic light-emitting diode (OLED), an active-matrix organic light emitting diode or an active-matrix organic light emitting diode (AMOLED), a flexible light-emitting diode (FLED), a Miniled, a MicroLed, a Micro-oLed, a quantum dot light emitting diode (QLED), or the like.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a still image or a video. An optical image is generated for an object through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include N cameras 193, where N is a positive integer greater than 1.

For example, the N cameras 193 may include one or more of the following cameras: a main camera, a long-focus camera, a wide-angle camera, an ultra-wide-angle camera, a macro camera, a fisheye camera, an infrared camera, and a depth camera.

(1) Main Camera

The main camera features large light intake, high resolution, and a centered field-of-view range. The main camera is usually used as a default camera of an electronic device (such as a mobile phone). To be specific, the electronic device (such as the mobile phone) can start the main camera by default in response to an operation performed by a user for starting a "Camera" application, and display, in a preview interface, an image captured by the main camera. A field-of-view range of a camera is determined by a field of view (FOV) of the camera, and a larger FOV of the camera indicates a larger field-of-view range of the camera.

(2) Long-Focus Camera

The long-focus camera has a relatively large focal length, and is applicable to photographing a photographed object (that is, a distant object) relatively far away from a mobile phone. However, the long-focus camera has relatively small light intake. When the long-focus camera is used to capture an image in a dark light scene, quality of the image may be affected due to insufficient light intake. In addition, the long-focus camera has a relatively small field-of-view range, and is not applicable to capturing an image in a relatively large scene, that is, not applicable to photographing a relatively large photographed object (such as a building or a landscape).

(3) Wide-Angle Camera

The wide-angle camera has a relatively large field-of-view range, and each focusing distance value indicated by a focusing range is relatively small (compared with that of the main camera). The wide-angle camera is more applicable to photographing a relatively close photographed object than the main camera. The focusing range is a numerical range, each value in the numerical range corresponds to one focusing distance value, and the focusing distance value is a distance between a lens and a photographed object when the camera succeeds in focusing.

(4) Ultra-Wide-Angle Camera

The ultra-wide-angle camera and the wide-angle camera are a same type of camera. Alternatively, compared with the wide-angle camera, the ultra-wide-angle camera has a larger field-of-view range, and a smaller focusing distance value indicated by a focusing range.

(5) Macro Camera

The macro camera is a special lens used for macro photography, and is mainly used to photograph very subtle objects, such as flowers and insects. When a macro lens is used to photograph small natural scenes, microscopic scenes that people usually cannot see can be photographed.

(6) Fisheye Camera

The fisheye camera is an auxiliary lens with a focal length of 16 mm or smaller and a field of view close to or equal to 180°. The fisheye camera may be considered as an extreme wide-angle camera. A front lens of the camera is very short in diameter and protrudes towards the front of the lens in a parabolic shape, and is quite similar to eyes of a fish. Therefore, the camera is referred to as the fisheye camera. An image captured by the fisheye camera is very different from an image of a real world in people's eyes. Therefore, the fisheye camera is usually used to obtain a special photographing effect.

(7) Infrared Camera

The infrared camera features a large spectral range. For example, the infrared camera not only can sense visible light, but also can sense infrared light. In a dark light scene (that is, visible light is weak), the infrared camera can be used to capture an image by using a feature that the infrared camera can sense the infrared light, thereby improving quality of the image.

(8) Depth Camera

Time of flight (ToF) cameras, structured light cameras, or the like are all depth cameras. For example, the depth camera is a ToF camera. The ToF camera has a feature of accurately obtaining depth information of a photographed object. The ToF camera is applicable to scenarios such as face recognition.

The digital signal processor is configured to process a digital signal, and can process another digital signal in addition to processing a digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of encoding formats such as moving picture experts group (moving picture experts group, MPEG) 1, MPEG 2, MPEG 3, and MPEG 4.

The NPU is a neural-network (NN) computing processor, which quickly processes input information by referring to a biological neural network structure, for example, by referring to a transmission mode between human brain neurons, and may further perform self-learning continuously. Applications such as intelligent cognition of the electronic device 100, for example, image recognition, face recognition, speech recognition, and text understanding, may be implemented by using the NPU.

Figure 2:
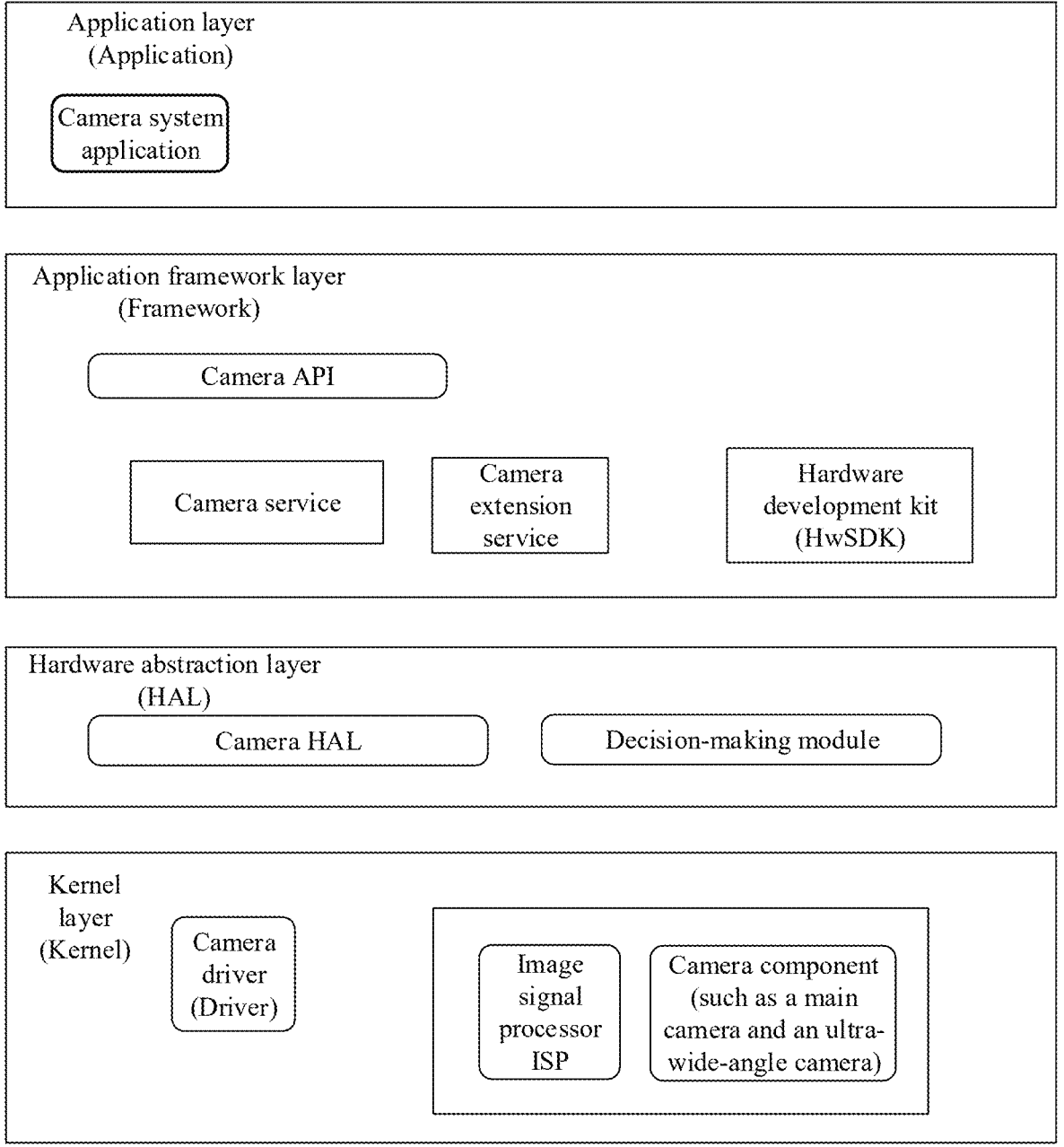
FIG. 2 is a schematic diagram of a software structure of an electronic device according to an embodiment of this application.

FIG. 2 is a block diagram of a software structure of the electronic device 100 according to an embodiment of this application. In a layered architecture, software may be divided into several layers, and each layer has a clear role and task. The layers communicate with each other through a software interface. In some embodiments, an Android system is divided into four layers from top to bottom: an application program layer (referred to as an application layer), an application framework layer (referred to as a framework layer), a hardware abstraction layer (HAL), and a kernel layer (Kernel, also referred to as a driver layer).

The application layer (Application) may include a series of application packages. The application layer may include a plurality of application packages. The plurality of application packages may be applications such as Camera, Gallery, Calendar, Calls, Maps, Navigation, WLAN, Bluetooth, Music, Videos, Messages, and Launcher (Launcher). For example, as shown in FIG. 2, the application layer may include a camera system application (also referred to as a camera application).

As shown in FIG. 2, the camera system application may be configured to display, in a framing interface, an image stream reported by a lower layer. The framing interface may be a preview framing interface displayed before a picture is actually taken or a video is actually shot, or the framing interface may be a photographing framing interface displayed during video shooting.

As described above, the electronic device 100 may include a plurality of cameras, each camera can be configured to capture an image, and a plurality of consecutive frames of images captured by the camera may form an image stream. In other words, each of the foregoing cameras can be configured to capture the image stream.

Although the plurality of cameras of the electronic device 100 each can capture the image stream, generally, the image stream captured by only one camera is displayed in the framing interface.

In this embodiment of this application, the electronic device may include a plurality of types of cameras. Different types of cameras may correspond to different focusing ranges. For example, the electronic device includes a main camera and an ultra-wide-angle camera. Focusing distance ranges of the main camera and the ultra-wide-angle camera are different. In this way, the main camera and the ultra-wide-angle camera are applicable to different photographing distances (actual distances between a photographed object and the camera).

Each camera in the electronic device corresponds to one camera identifier (Camera ID), and camera identifiers of different cameras are different. In some embodiments, the application layer may indicate, based on an operation of a user by using the Camera ID of the camera, a lower layer (for example, the kernel layer) to start a corresponding camera. The enabled camera may also be referred to as a preview camera. Then, the electronic device may further indicate, based on the Camera ID of the camera, a lower layer (for example, the framework layer) to process a preview image stream captured by the preview camera. The application layer may further indicate, based on an operation of the user by using the Camera ID of the camera, a lower layer (for example, the kernel layer) to disable the corresponding camera.

The framework layer (Framework) provides an application programming interface (API) and a programming framework for applications at the application layer. The application framework layer includes some predefined functions. As shown in FIG. 2, the framework layer may provide a camera API, for example, a Camera API, a camera service (Camera Service), a camera extension service (Camera Service Extra), and a hardware development kit (hardware software development kit, Hw SDK).

The Camera API serves as an interface for interaction between a lower layer (for example, the hardware abstraction layer) and the application layer. Specifically, the Camera API may further receive a camera switching notification from an upper layer (for example, the application layer). The camera switching notification includes a Camera ID of a preview camera to be switched to. For example, during running of the camera application, a user indicates to switch to enable the ultra-wide-angle camera, and the application layer may send a camera switching notification to the Camera API, where the camera switching notification includes a Camera ID of the ultra-wide-angle camera. The camera switching notification may be transmitted to a lower layer (for example, the kernel layer) through the framework layer and the HAL layer, so that the lower layer actually performs camera switching.

In this embodiment of this application, when the application layer interacts with a user to trigger the electronic device 100 to switch the preview camera, the application layer may refresh Surface view in real time, for example, Surface view is updated to an image stream captured by a preview camera switched to.

The HAL layer is used to connect the framework layer and the kernel layer. For example, the HAL layer may transparently transmit data between the framework layer and the kernel layer. Certainly, the HAL layer may also process data from a lower layer (that is, the kernel layer), and then transmit processed data to the framework layer. For example, the HAL layer may convert a parameter related to a hardware device at the kernel layer into a software programming language that can be identified by the framework layer and the application layer. For example, the HAL layer may include a Camera HAL and a decision-making module.

In addition to a user operation, the electronic device may further identify a photographing scene by using the decision-making module, and then switch to a matched camera based on the identified photographing scene. In other words, after identifying a photographing scene, the decision-making module may determine a camera that matches the photographing scene, for example, the camera is referred to as a matched camera. When the matched camera is different from the preview camera, the decision-making module may send a camera switching notification to a lower layer (for example, the kernel layer). The camera switching notification carries a Camera ID of the matched camera, and is used to indicate the lower layer to actually perform camera switching, that is, to enable/disable a corresponding camera.

For example, in photographing scene corresponding to different photographing distances, the decision-making module may indicate, based on the different photographing distances, the kernel layer to enable different cameras to perform photographing. For example, in a scenario in which a focal length range of ultra-wide-angle photographing is applicable to a photographing distance less than 10 cm, when determining that the photographing distance is less than 10 cm, the decision-making module indicates the kernel layer to enable the ultra-wide-angle camera. In this way, the electronic device can capture a clear image in cases of different photographing distances.

In other words, the HAL layer may manage, based on a notification from an upper layer (for example, the framework layer and the application layer), image streams captured by a plurality of cameras, for example, indicate, based on the notification from the upper layer, a lower layer (for example, the kernel layer) to disable/enable an image stream of a camera. The HAL layer may further manage, based on an identified photographing scene, the image streams captured by the plurality of cameras.

The kernel layer includes a camera driver, an image signal processor ISP, and a Camera component. The Camera component may include a plurality of cameras, and each camera includes a camera lens, an image sensor, and the like. The image signal processor ISP may be disposed separate from the camera (for example, the Camera component). In some other embodiments, the image signal processor ISP may be disposed in the camera (for example, the Camera component).

The image signal processor ISP and the Camera component are main devices for shooting a video or taking a picture. An optical signal reflected by a framing environment irradiates the image sensor through the camera lens and then may be converted into an electrical signal, the electrical signal is processed by the image signal processor ISP and then may be used as an original parameter stream (that is, an image stream), and the original parameter stream is transmitted to an upper layer by the camera driver. In addition, the camera driver may further receive a notification from the upper layer (for example, the notification indicates to enable or disable a camera), and send a function processing parameter stream to the Camera component based on the notification, to enable or disable a corresponding camera.

In summary, the electronic device may include a plurality of different types of cameras. The electronic device not only can switch between different cameras in response to an instruction of a user, but also can automatically identify a photographing scene and switch to a matched camera. A process of switching between different cameras in the electronic device is described below by mainly using an example of a photographing scene indicating different photographing distances.

In some embodiments, during display of a preview framing interface, the electronic device measures a distance value between a photographed object and a camera by using a ranging component. For example, the ranging component may be an infrared ranging sensor, and the infrared ranging sensor needs to be configured near the camera. In this way, the ranging component can detect a change in a distance between the camera and the photographed object. Apparently, separately mounting the ranging component for the camera undoubtedly increases hardware costs of the electronic device. In addition, when no ranging component is configured on an electronic device, or the ranging component configured on the electronic device is shielded, the electronic device cannot automatically switch a camera based on a photographing distance, which directly affects photographing quality of the electronic device. For example, when the photographing distance is relatively short, a main camera continues to be used, and a wide-angle camera or an ultra-wide-angle camera is not switched to, and consequently, a captured image frame is blurred. For another example, in a process in which the photographing distance changes from short to long, if switching from the ultra-wide-angle camera to the main camera is not performed, a picture in a captured image frame is distorted or the like.

An embodiment of this application provides a camera switching method, which is applied to the electronic device 100 having the foregoing software and hardware structures. After the method is enabled for the electronic device 100, during display of a preview framing interface of a camera application, the electronic device 100 may switch, without using a ranging component, a matched camera as a photographing distance changes.

An implementation principle of the camera switching method provided in this embodiment of this application is described below by continuing to use a mobile phone as the electronic device.

In some embodiments, the mobile phone may include a plurality of cameras, for example, a first camera and a second camera. Lens orientations of the first camera and the second camera are the same. For example, both the first camera and the second camera are rear-facing cameras of the mobile phone. In addition, focusing ranges corresponding to the first camera and the second camera are different. For example, the first camera may be a main camera, and a focusing range is an interval greater than 7 cm; and the second camera may be a rear-facing ultra-wide-angle camera, and a focus range is an interval greater than 2 cm.

Figure 3:
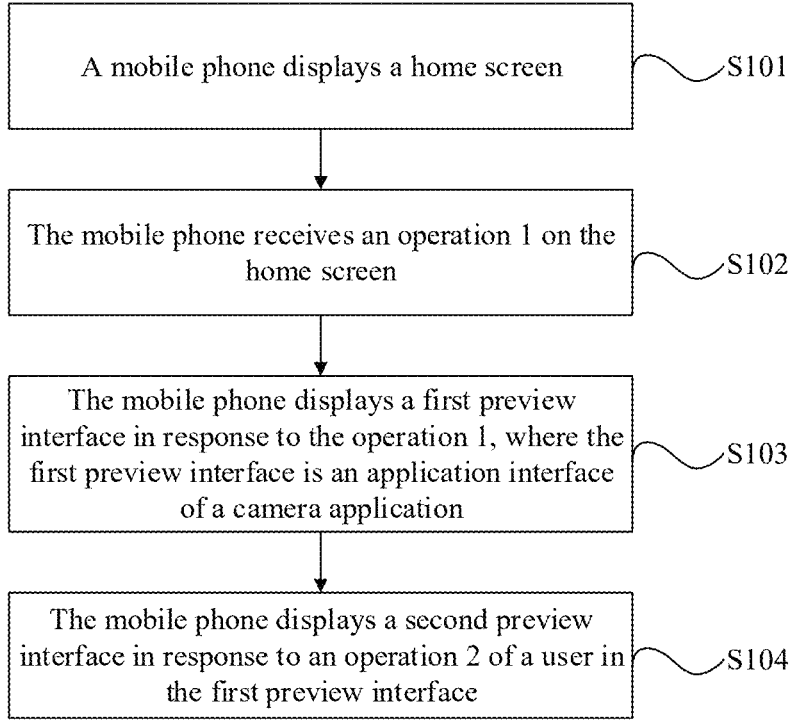
FIG. 3 is a first flowchart of a camera switching method according to an embodiment of this application.

In this application scenario, according to the method in this embodiment of this application, the mobile phone may switch between the first camera and the second camera based on an instruction of a user during display of a preview framing interface. For example, as shown in FIG. 3, the camera switching method may include the following steps.

S101: The mobile phone displays a home screen.

Figure 4A:
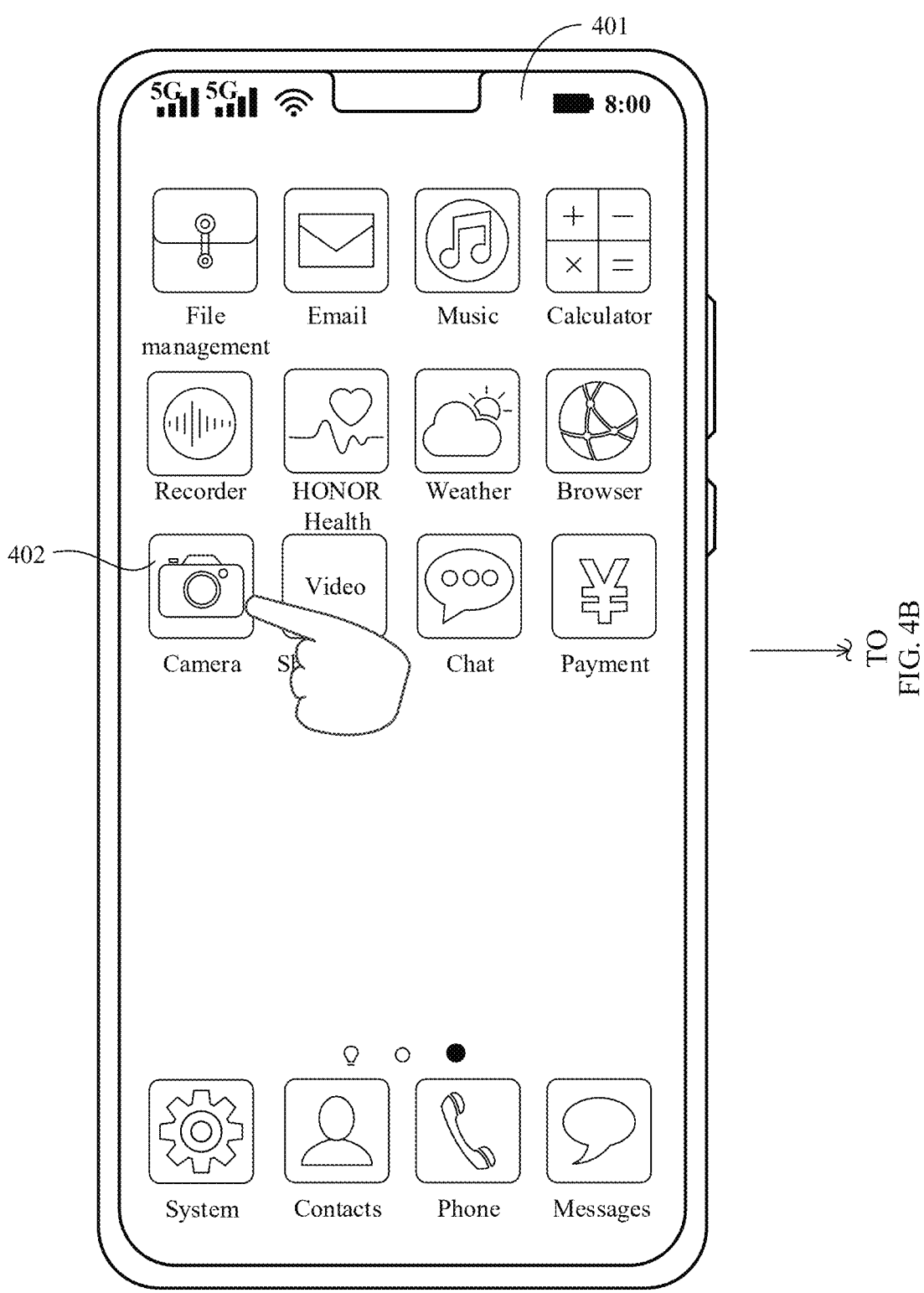
FIG. 4A and FIG. 4B are first schematic diagrams of interface display of an electronic device (such as a mobile phone) according to an embodiment of this application.

In some embodiments, as shown in FIG. 4A, the home screen 401 includes application icons of a plurality of applications, for example, an application icon of a camera application, such as a camera application icon 402. For example, the mobile phone may display the home screen in response to an operation of indicating, by a user, to cancel a lock screen interface. For another example, the mobile phone may display the home screen in response to an operation of indicating, by a user, to exit an application running in the foreground. For still another example, the mobile phone may display the home screen in response to an operation of lighting up a display by a user.

S102: The mobile phone receives an operation 1 on the home screen.

In some embodiments, the operation 1 is used to trigger the mobile phone to run the camera application in the foreground. The operation 1 may also be referred to as a first operation.

For example, as shown in FIG. 4A, the operation 1 may be that a user taps the camera application icon 402 on the home screen 401.

For another example, when the camera application runs in the background, the operation 1 may be an operation indicating to switch the camera application from a background running state to a foreground running state. For example, a user performs a slide-up operation on the home screen 401, and the mobile phone displays a multi-task interface in response to the slide-up operation. The multi-task interface includes a first window, and the first window displays a thumbnail application interface of the camera application. Then, the user taps the first window in the multi-task interface.

S103: The mobile phone displays a first preview interface in response to the operation 1, where the first preview interface is an application interface of the camera application.

Figure 4B:
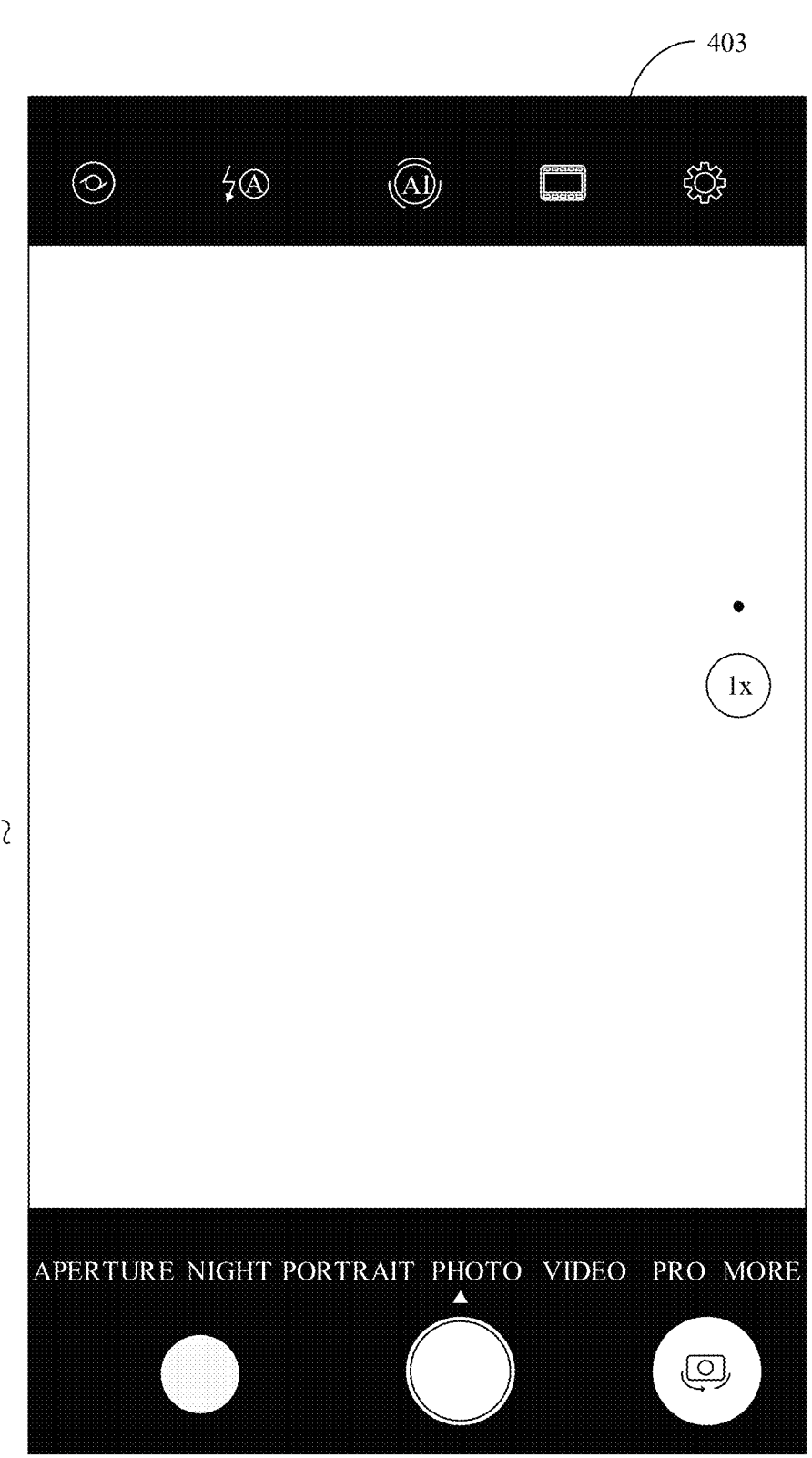

In some embodiments, the first preview interface may be a preview framing interface corresponding to picture taking, and may also be referred to as a first interface. For example, as shown in FIG. 4B, after the user taps the camera application icon 402, the mobile phone displays a camera application interface such as a framing interface 403 in response to the operation 1.

In some embodiments, the first camera may be a default camera. It may be understood that the default camera is a camera that is enabled by default when the mobile phone enables the camera application. That the mobile phone enables the camera application means the following: The mobile phone runs the camera application in a scenario in which an application (referred to as a background application) running in the background of the mobile phone does not include the camera application.

In some examples, in a scenario in which the first camera is the default camera and the background application of the mobile phone does not include the camera application, the first preview interface displayed by the mobile phone in response to the operation 1 includes an image frame captured by the first camera.

In some other examples, the background application of the mobile phone includes the camera application, and before the camera application runs in the background, a camera used is the first camera. In this case, the first preview interface displayed by the mobile phone in response to the operation 1 also includes an image frame captured by the first camera.

In this way, before the mobile phone displays the framing interface 403, the camera application may further send a lens start notification 1 to a lower layer (for example, a kernel layer) through a framework layer, where the lens start notification 1 includes a Camera id of the first camera (for example, the main camera). The camera application indicates, by using the lens start notification 1, the lower layer to enable the first camera (for example, the main camera). In this way, the camera application can receive an image frame backhauled by the first camera. After the mobile phone displays the framing interface 403, the image frame back-hauled by the first camera may be displayed in the framing interface 403, that is, the image frame captured by the first camera is sent for display, for example, an image frame 501 shown in FIG. 5A. The image frame 501 displays a photographed object "postcard".

In addition, the framing interface 403 includes a plurality of function controls of the camera application, and different function controls correspond to different camera functions. For example, the plurality of function controls may include an APERTURE control, a NIGHT control, a PORTRAIT control, a PHOTO control, and a VIDEO control. Certainly, because of limited display space, some functions of the camera application are not displayed in the framing interface 403. However, the framing interface 403 further displays a "MORE" control. The "MORE" control is used to trigger the mobile phone to display a function control that is not displayed in the framing interface 403.

In some embodiments, in the framing interface 403 displayed by the mobile phone in response to the operation 1, the PHOTO control is in a selected state. In the framing interface 403, an identifier (for example, a triangle identifier) used to indicate a selected state is displayed corresponding to the PHOTO control. During display of the framing interface 403, the user may operate different function controls to switch to display application interfaces corresponding to different functions. In addition, the user may operate the "MORE" control in the framing interface 403 to switch to display an interface that includes other function controls.

S104: The mobile phone displays a second preview interface in response to an operation 2 of a user in the first preview interface.

In some embodiments, the operation 2 is an operation indicating to enable a SUPER MACRO function, and the second preview interface is an application interface corresponding to the SUPER MACRO function. A function control corresponding to the SUPER MACRO function is not displayed in the framing interface 403 currently. The user may operate the "MORE" control in the framing interface 403 to search the function control corresponding to the SUPER MACRO function.

Figure 5A:
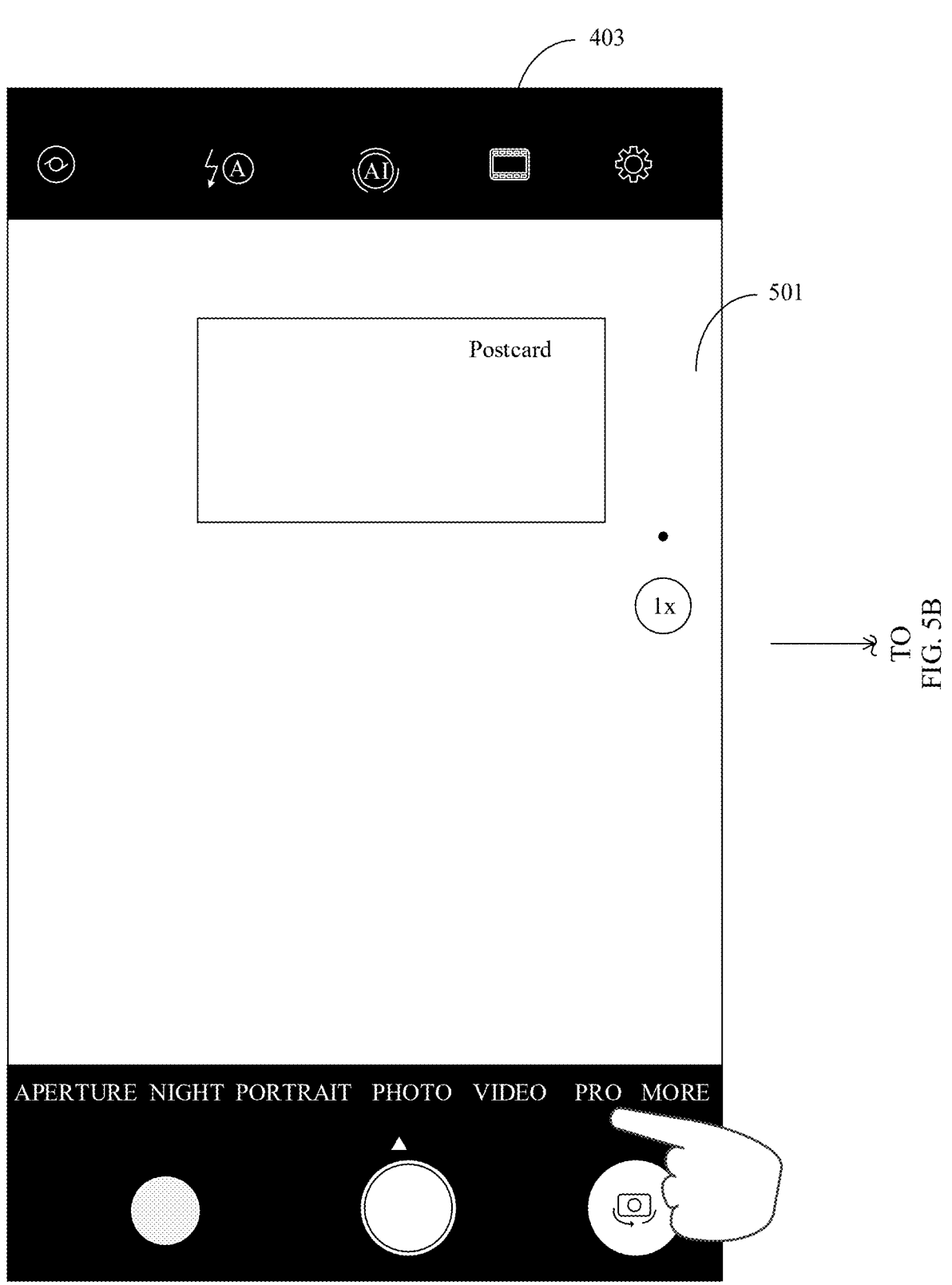
FIG. 5A to FIG. 5C are second schematic diagrams of interface display of a mobile phone according to an embodiment of this application.
Figure 5B:
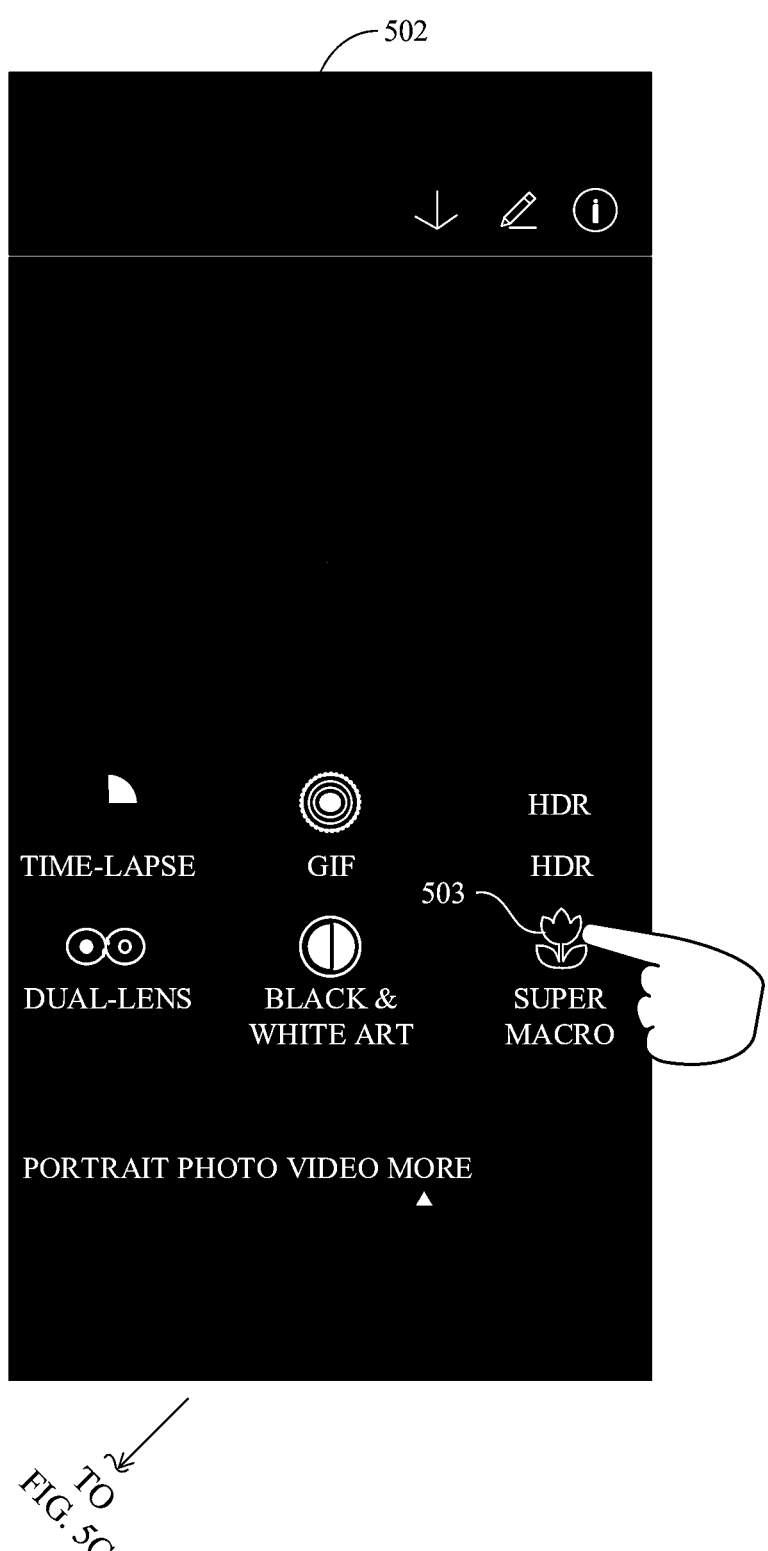

For example, as shown in FIG. 5A, the mobile phone detects an operation performed by the user on the "MORE" control. For example, when the operation is a tap operation, the mobile phone may switch to display a function selection interface 502. The function selection interface 502 includes function controls that are not displayed in the framing interface 403, for example, a SUPER MACRO control 503, a TIME-LAPSE control, a GIF control, an HDR control, and a DUAL-LENS control. When detecting that the user taps the SUPER MACRO control 503 in the function selection interface 502, the mobile phone may display the second preview interface, for example, an interface 504. Compared with the framing interface 403, the SUPER MACRO control is newly added to the interface 503. The SUPER MACRO control replaces a display location of the original "MORE" control.

Before the second preview interface is displayed, the camera application may further send a lens start notification 2 to a lower layer (for example, the kernel layer) through the framework layer, where the lens start notification 2 includes a Camera id of the second camera (for example, the ultra-wide-angle camera). The camera application indicates, by using the lens start notification 2, the lower layer to enable the second camera (for example, the ultra-wide-angle camera). In some examples, in a scenario in which the user manually enables the SUPER MACRO function, the first camera may be disabled when the second camera is enabled. In some other examples, in a scenario in which the user manually enables the SUPER MACRO function, the first camera may not be disabled, but the mobile phone displays only an image frame captured by the second camera.

Figure 5C:
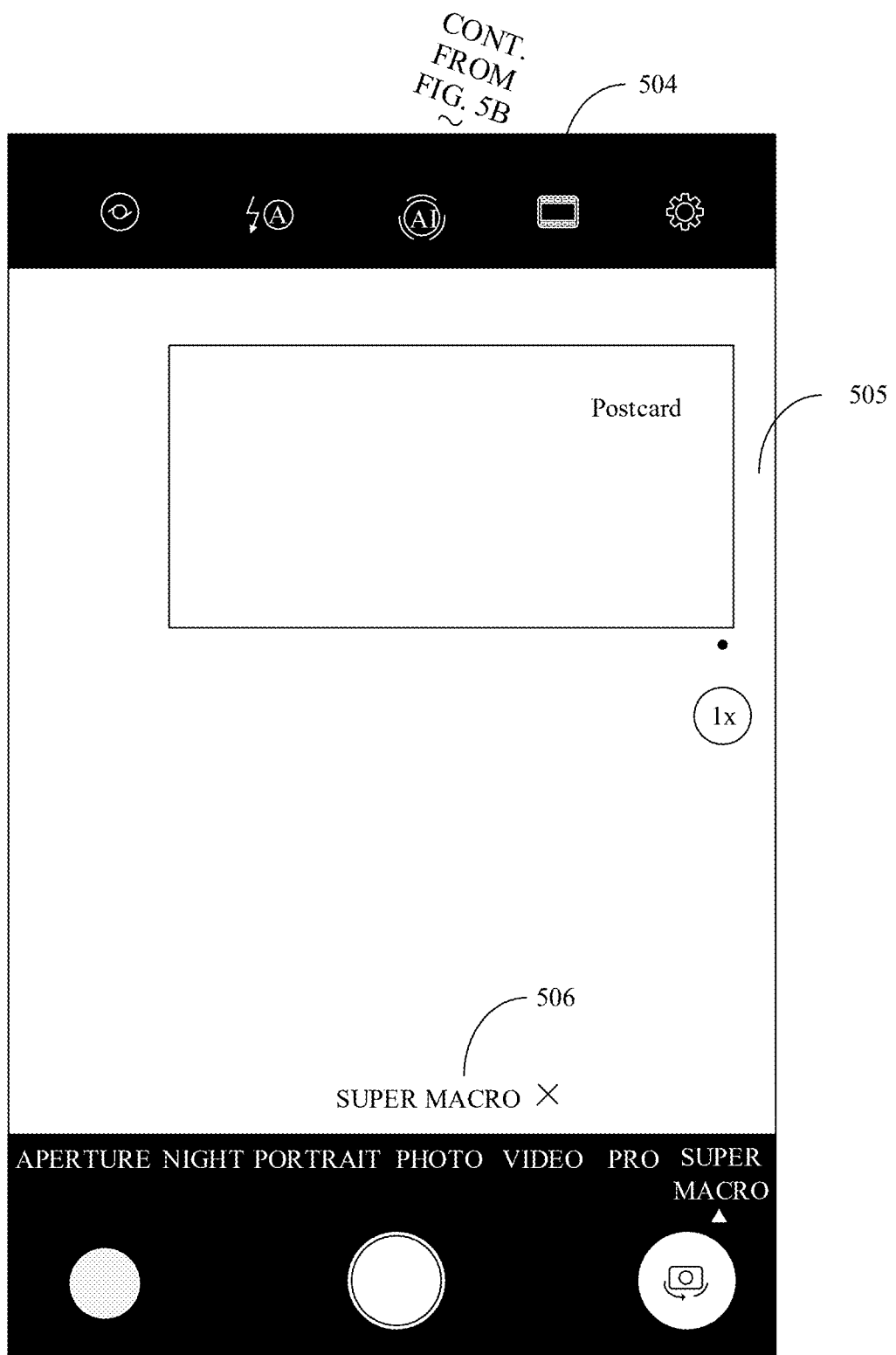

For example, after the mobile phone displays the interface 504, the image frame backhauled by the second camera may be displayed in the interface 504, for example, an image frame 505 shown in FIG. 5C. The image frame 505 also displays a photographed object "postcard". Certainly, the image frame 501 and the image frame 505 are captured by cameras with different focusing ranges. Through comparison, a focusing range of the second camera indicates a smaller focusing distance value, and the photographed object occupies a larger display area in the captured image frame 505.

In addition, both the first preview interface (for example, the framing interface 403) and the second preview interface (for example, the interface 504) are preview framing interfaces provided by the camera application. A main difference between the first preview interface and the second preview interface lies in the following: The first preview interface is a framing interface corresponding to a conventional photographing function and is used to display an image frame captured by the first camera; and the second preview interface is a framing interface corresponding to the SUPER MACRO function and is used to display an image frame captured by the second camera. To facilitate differentiation by the user, the second preview interface may further display an identifier indicating SUPER MACRO, for example, an identifier 506.

During display of the second preview interface (for example, the interface 504), the user may further operate the identifier 506 in the second preview interface to indicate the mobile phone to switch to display the first preview interface. For example, the mobile phone detects that the user taps the identifier 506 in the second preview interface, and can switch to display the first preview interface. In addition, before the first preview interface is displayed, the camera application may send a lens start notification 3 to a lower layer (for example, the kernel layer) through the framework layer, where the lens start notification 3 includes the Camera id of the first camera (for example, the main camera). For example, if the first camera is in an enabled state, the lower layer may backhaul, to the camera application in response to the lens start notification 3, the image frame captured by the first camera; or if the first camera is in a disabled state, the lower layer may enable the first camera in response to the lens start notification 3, and backhaul, to the camera application, the image frame captured by the first camera.

In addition, the lower layer may further disable the second camera in response to the lens start notification 3. In some other embodiments, after receiving the lens start notification 3, the lower layer may not disable the second camera, but no longer send, for display, the image frame captured by the second camera.

As described in the foregoing embodiment, the mobile phone switches between the first camera and the second camera based on an operation of the user, so that the mobile phone can capture a high-quality image at different photographing distances.

In addition, the mobile phone may also automatically identify a photographing distance, and switch between the first camera and the second camera based on the identified photographing distance. This is described below by using several types of scenarios as examples.

Figure 6:
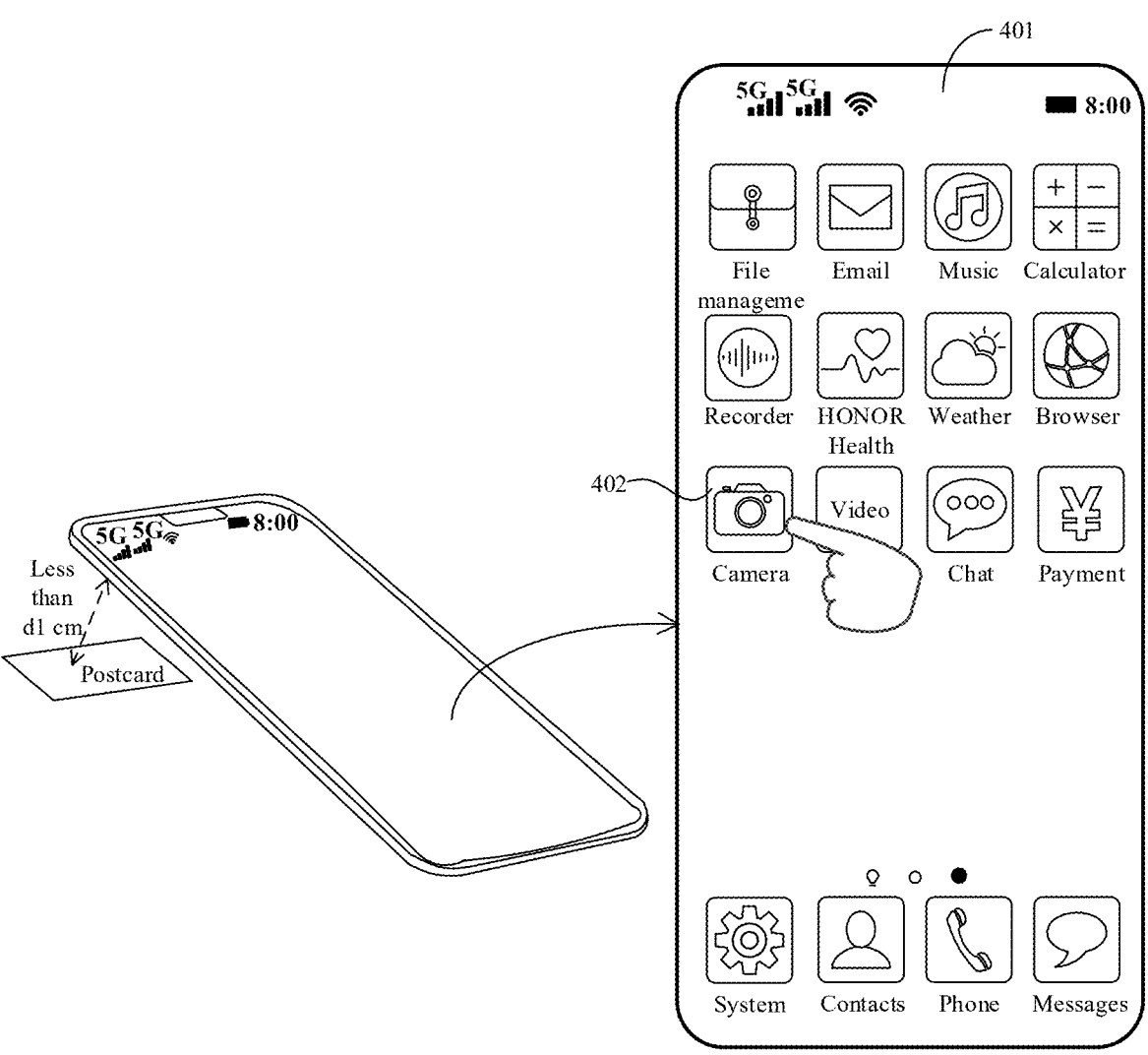
FIG. 6 is an example diagram of a photographing scene according to an embodiment of this application.

In a first-type scenario, as shown in FIG. 6, an actual photographing distance between a photographed object (for example, a postcard) and the mobile phone is less than d1 cm (also referred to as a first value), where d1 cm is a minimum focusing distance of a default camera (for example, the first camera), that is, a minimum photographing distance that can be focused. For example, if the first camera is a main camera, and a minimum focusing distance of the main camera is 7 cm, d1 may be 7 cm. As shown in FIG. 6, the mobile phone may display the home screen 401. In addition, in the first-type scenario, the background application of the mobile phone does not include the camera application, or the background application of the mobile phone includes the camera application, and a camera used before the camera application runs in the background is the default camera. In this way, in the first-type scenario, when the mobile phone runs the camera application in response to a user operation, the mobile phone needs to enable the first camera to capture an image frame.

Figure 7A:
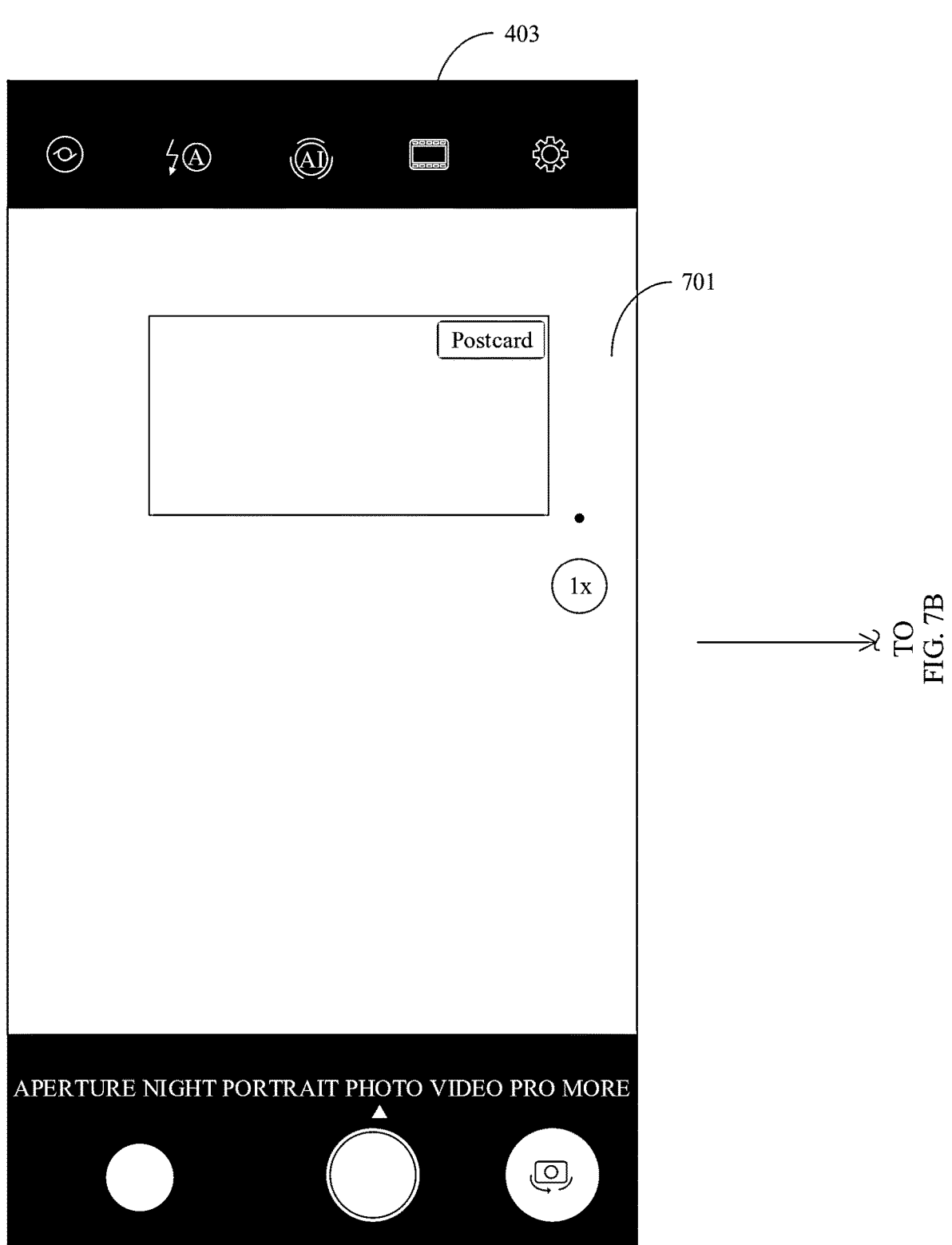
FIG. 7A and FIG. 7B are third schematic diagrams of interface display of a mobile phone according to an embodiment of this application.

For example, as shown in FIG. 6, in the first-type scenario, when the mobile phone receives an operation of tapping the camera application icon 402 on the home screen 401 by the user during display of the home screen 401, the mobile phone may display the first preview interface (for example, the framing interface 403 shown in FIG. 7A) in response to the operation, that is, the first operation.

Before the first preview interface is displayed, the camera application may indicate, through the framework layer, a lower layer (the kernel layer) to enable the first camera. However, because the photographing distance in this case is less than the minimum focusing distance of the first camera, the first camera may fail in focusing. In this case, the image frame captured by the first camera is blurred. In this way, after the mobile phone displays the first preview interface (for example, the framing interface 403), an image frame 701 displayed in the framing interface 403 is blurred.

In this scenario, as shown in FIG. 8, the method provided in this embodiment of this application may further include the following steps.

S201: Obtain a first real-time parameter of the first camera during display of the first preview interface by the mobile phone, where the first real-time parameter is used to indicate a real-time photographing status of the first camera.

In some embodiments, the first real-time parameter may include at least one of a focusing status, a defocus value, and a code (code) value of a voice coil motor (voice coil motor, VCM) that are of the first camera.

The VCM in the first camera may adjust a lens (Lens) location of the first camera to change a focal length of the first camera. The VCM adjusts the Lens location of the first camera to adjust the focal length, so that the image frame captured by the first camera is clear. In a process in which the VCM adjusts the Lens location, the code value of the VCM changes correspondingly. The code value of the VCM may also be referred to as a VCM code value of the first camera. When focusing succeeds, there is a linear correspondence between the VCM code value of the first camera and an actual photographing distance (a distance between a photographed object and the first camera), for example, the linear correspondence is referred to as a correspondence 1. The correspondence 1 may be obtained by performing a calibration test on the first camera in advance, and stored in the mobile phone for ease of query. In this way, in this embodiment of this application, an actual photographing distance may be estimated by using the VCM code of the first camera. Certainly, in a scenario in which all focusing fails (for example, a photographing distance is less than the minimum focusing distance of the first camera) in a journey range in which the VCM adjusts the Lens, the VCM code cannot be used to estimate an accurate photographing distance.

The focusing status includes three states: focusing succeeds, focusing fails, and being in focusing. The mobile phone may estimate the focusing status based on an image frame actually captured by the first camera. For a specific process, refer to a related technology. Details are not described herein again.

The defocus value is a value obtained after conversion is performed based on a photographing phase difference. A larger photographing phase difference indicates that a focal point formed after light reflected by a photographed object passes through the first camera is farther from an imaging surface of the first camera, and in this case, focusing of the first camera is blurred. On the contrary, a smaller photographing phase difference indicates that a focal point formed after light reflected by a photographed object passes through the first camera is closer to the imaging surface of the first camera, and in this case, the first camera can succeed in focusing. In other words, when focusing of the first camera is blurred, a corresponding defocus value is also relatively large, which is unreliable. When focusing succeeds, the defocus value approaches 0. For example, an absolute value of the defocus value is less than a second threshold. The second threshold is an empirical value, and the empirical value depends on that picture sharpness displayed when an absolute defocus value is less than the empirical value is acceptable. In this way, the mobile phone may also determine, by using the defocus value, whether the obtained VCM code can accurately indicate a photographing distance.

In addition, a manner of obtaining the defocus value corresponding to the first camera includes: obtaining the defocus value in a single-window scenario and obtaining the defocus value in a multi-window scenario. The single-window scenario usually means that there is a single photographed object in a field of view of the first camera and only one window area is occupied. In the single-window scenario, a defocus value of the window is used as the defocus value currently corresponding to the first camera. The multi-window scenario usually means that there are a large quantity of photographed objects in the field of view of the first camera and a plurality of window areas are occupied. In the multi-window scenario, to prevent impact of a depth of field, a defocus value of a center window (a window area located in the middle) in the field of view of the first camera may be used as the defocus value currently corresponding to the first camera. In addition, for a manner of obtaining a defocus value corresponding to each window, refer to a related technology. Details are not described herein again.

In some embodiments, during display of the first preview interface, the mobile phone may obtain a group of first real-time parameters, that is, a focusing status, a defocus value, and a VCM code value, based on each image frame captured by the first camera.

In some other embodiments, during display of the first preview interface, the mobile phone obtains a corresponding focusing status based on the image frame captured by the first camera. When the focusing status is "being in focusing", after the first camera captures a specified quantity of image frames again, the mobile phone obtains the focusing status based on the image frame newly captured by the first camera again until the obtained focusing status is that focusing succeeds or focusing fails, and further obtains a defocus value and a VCM code value that correspond to the image frame.

S202: When the focusing status in the first real-time parameter is that focusing fails, determine that a sum of the defocus value in the first real-time parameter and a lenpos value indicated by the VCM code is less than a preset first threshold.

The first threshold may be an empirical value ranging from −1 to −5. In addition, first thresholds of different cameras may be different. For example, a first threshold of the first camera obtained through a test may be −5, and the first threshold may be configured in the mobile phone to facilitate query and use by the mobile phone. In addition, the lenpos value (also referred to as a second value) is used to indicate a focus adjustment location of a lens in the first camera. The lenpos value is an integer sequence obtained by quantizing a value range of the VCM code, and a minimum value of the lenpos value is 0. When the lenpos value is 0, a location of the lens enables the first camera to reach the minimum focusing distance. A larger lenpos value indicates a farther focusing distance of the first camera. The lenpos value may be obtained by converting the VCM code. For a specific conversion process, refer to a related technology. Details are not described herein again.

When the focusing status in the first real-time parameter is that focusing fails, and the sum of the defocus value in the first real-time parameter and the lenpos value indicated by the VCM code is less than the preset first threshold, it may be referred to as that the mobile phone meets a first condition.

S203: The mobile phone determines to enable the SUPER MACRO function.

Figure 7B:
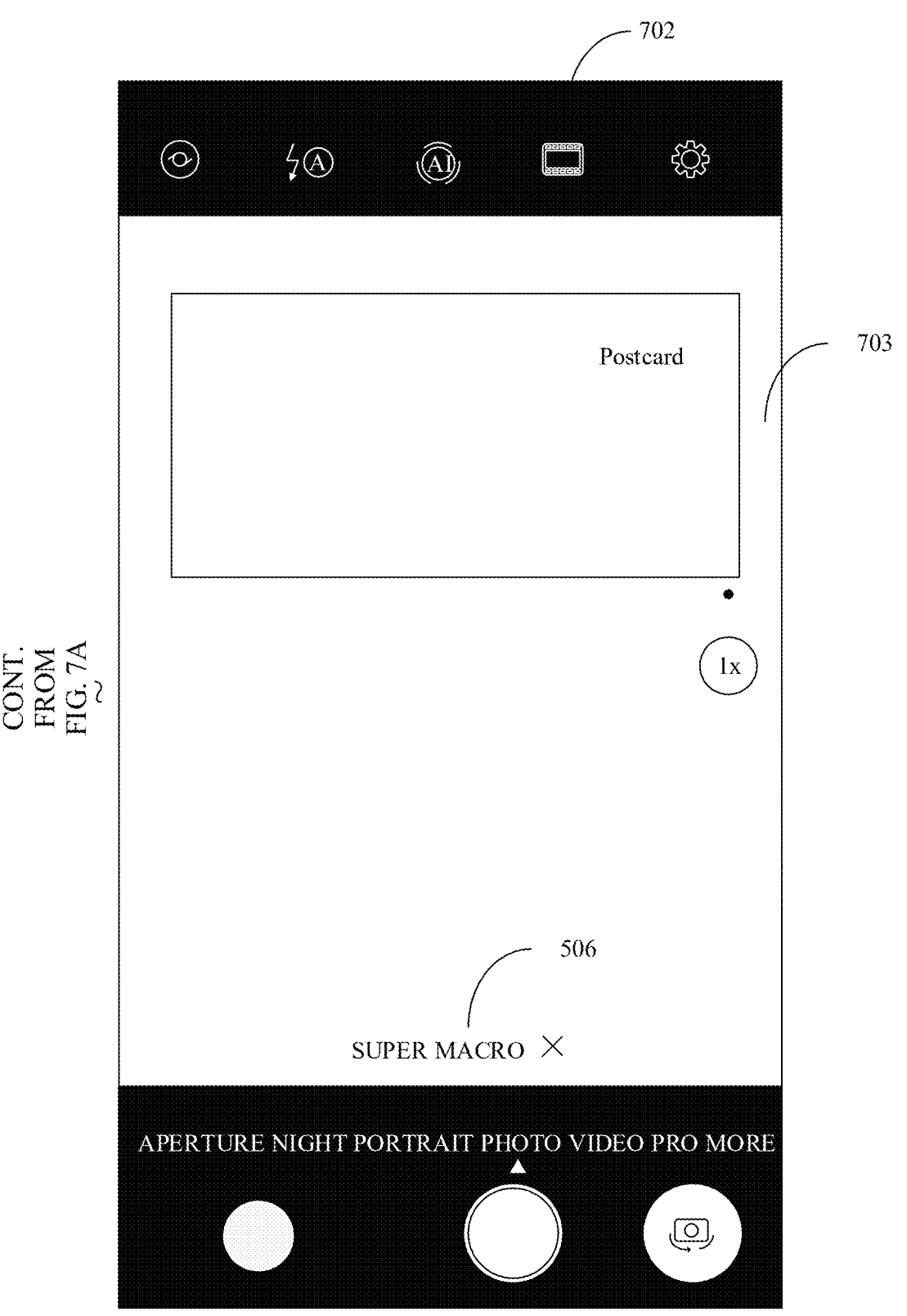

In some embodiments, after determining to enable the SUPER MACRO function, the mobile phone switches to display a third preview interface (for example, an interface 702 in FIG. 7B), which is also referred to as a second interface. The third preview interface and the second preview interface are similar, and both can display an image frame captured by the second camera. For example, the third preview interface (the interface 702 shown in FIG. 7B) displays an image frame 703 captured by the second camera, and the second preview interface (the interface 504 in FIG. 5C) displays the image frame 505 captured by the second camera. Similarly, the interface 702 also includes an identifier indicating SUPER MACRO, for example, the identifier 506. The identifier 506 may also be referred to as a first identifier. In addition, when the mobile phone receives an operation of tapping the identifier 506 by the user, for example, referred to as a second operation, the mobile phone may exit the SUPER MACRO function, that is, switch to display the first preview interface, and send, for display in the first preview interface, an image frame captured by the first camera.

Certainly, before the third preview interface (for example, the interface 702 in FIG. 7B) is displayed, the camera application may send a lens start notification 4 to a lower layer (for example, the kernel layer) through the framework layer, where the lens start notification 4 includes the Camera id of the second camera (for example, the ultra-wide angle camera). The camera application indicates, by using the lens start notification 4, the lower layer to enable the second camera (for example, the ultra-wide-angle camera), and transfer, to the camera application, an image frame captured by the second camera. Certainly, the first camera continues to capture an image frame, but the mobile phone does not display the image frame captured by the first camera.

In a second-type scenario, an actual photographing distance between a photographed object (for example, a postcard) and the mobile phone is not less than d1 cm and is less than d2 cm, where d2 cm is a photographing distance at which the second camera can be enabled, and may also be referred to as a fourth value. For example, d2 may be 10 cm. A value of d2 may be determined through a pre-test.

For example, the second-type scenario may mean that during display of the first preview interface by the mobile phone (a scenario in which the SUPER MACRO function is not enabled), a distance between a camera and a photographed object changes to a value not less than d1 cm and less than d2 cm. Therefore, as shown in FIG. 9, the method further includes the following steps.

S301: Obtain a second real-time parameter of the first camera during display of the first preview interface by the mobile phone, where the second real-time parameter is used to indicate a real-time photographing status of the first camera.

In some embodiments, for implementation of S301, refer to S201. Details are not described herein again.

S302: When a focusing status in the second real-time parameter is that focusing succeeds, and an absolute value of a defocus value in the second real-time parameter is less than a second threshold, determine a predicted object distance 1 indicated by a VCM code value in the second real-time parameter.

In some embodiments, the second threshold may be a positive value relatively close to 0. The second threshold may be preconfigured in the mobile phone. For example, the second threshold may be preconfigured to 1 in the mobile phone. Certainly, the second threshold may be set based on an actual situation of a device. For example, the second threshold may be set to 30. All the foregoing are examples of the second threshold. This is not specifically limited in this embodiment of this application.

When the focusing status in the second real-time parameter is that focusing succeeds, and the absolute value of the defocus value in the second real-time parameter is less than the second threshold, it may be referred to as that the mobile phone meets a second condition.

In some embodiments, the mobile phone may query the correspondence 1 based on the VCM code value (also referred to as a VCM code) in the second real-time parameter to obtain a predicted object distance, that is, a photographing distance that is in the correspondence 1 and that corresponds to the VCM code value in the second real-time parameter.

S303: When the predicted object distance 1 is not less than d1 cm and is less than d2 cm, determine to enable the SUPER MACRO function.

In some embodiments, for the foregoing process of enabling the SUPER MACRO function, refer to the process of enabling the SUPER MACRO function in the first-type scenario, that is, displaying a third preview interface, and sending, for display in the third preview interface, an image frame captured by the second camera. Details are not described herein again.

For another example, the second-type scenario may alternatively mean that during display of the third preview interface by the mobile phone (a scenario in which the SUPER MACRO function is enabled), a distance between a camera and a photographed object changes to a value not less than d1 cm and less than d2 cm.

During display of the third preview interface, the mobile phone enables the second camera and displays the image frame captured by the second camera. In this period, the first camera also keeps a state of capturing an image frame. In this way, the mobile phone can still obtain, based on the image frame captured by the first camera, a focusing status, a defocus value, and a VCM code value of the first camera. The obtained focusing status, defocus value, and VCM code value may also be referred to as a third real-time parameter. In other words, during display of the third preview interface by the mobile phone, the third real-time parameter of the first camera may also be obtained.

When the focusing status in the third real-time parameter is that focusing succeeds, and an absolute value of the defocus value in the third real-time parameter is less than the second threshold, a predicted object distance 2 indicated by the VCM code value in the third real-time parameter is determined. When the predicted object distance 2 is not less than d1 cm and is less than d2 cm, the SUPER MACRO function continues to be used, that is, the third preview interface continues to be displayed.

In a third-type scenario, an actual photographing distance between a photographed object (for example, a postcard) and the mobile phone is not less than d2 cm and not greater than d3 cm, where d3 cm is greater than d2 cm. For example, the second camera is the ultra-wide-angle camera, d3 may be 15 cm, and d3 may also be referred to as a third value. An interval between d2 and d3 is used as a buffer to alleviate a ping-pong problem occurring in a process in which the mobile phone enables or exits the SUPER MACRO function.

For example, the third-type scenario may mean that during display of the first preview interface by the mobile phone (a scenario in which the SUPER MACRO function is not enabled), a distance between a camera and a photographed object changes to a value not less than d2 cm and not greater than d3 cm. In this way, during display of the first preview interface, the mobile phone enables the first camera and displays an image frame captured by the first camera. Therefore, the mobile phone may obtain a fourth real-time parameter of the first camera based on the image frame captured by the first camera, where the fourth real-time parameter is used to indicate a real-time photographing status of the first camera. When a focusing status in the fourth real-time parameter is that focusing succeeds, and an absolute value of a defocus value in the fourth real-time parameter is less than a second threshold, a predicted object distance 3 indicated by a VCM code value in the fourth real-time parameter is determined. When the predicted object distance 3 is not less than d2 cm and is not greater than d3 cm, the SUPER MACRO function is not enabled, that is, the first preview interface continues to be displayed, and an image frame captured by the first camera is sent for display in the first preview interface.

For another example, the third-type scenario may alternatively mean that during display of the third preview interface by the mobile phone displays (a scenario in which the SUPER MACRO function is enabled), a distance between a camera and a photographed object changes to a value not less than d2 cm and not greater than d3 cm. In this way, during display of the third preview interface, the mobile phone enables the second camera and displays an image frame captured by the second camera. In addition, the first camera of the mobile phone continues to capture an image frame. Although the image frame captured by the first camera is not sent for display, the mobile phone may also obtain a fourth real-time parameter of the first camera based on the image frame captured by the first camera, where the fourth real-time parameter is used to indicate a real-time photographing status of the first camera. When a focusing status in the fourth real-time parameter is that focusing succeeds, and an absolute value of a defocus value in the fourth real-time parameter is less than a second threshold, a predicted object distance 4 indicated by a VCM code value in the fourth real-time parameter is determined. When the predicted object distance 4 is not less than d2 cm and is not greater than d3 cm, the SUPER MACRO function continues to be used, that is, the third preview interface continues to be displayed, and an image frame captured by the second camera is sent for display in the third preview interface.

In a fourth-type scenario, an actual photographing distance between a photographed object (for example, a postcard) and the mobile phone is greater than d3 cm.

For example, the fourth-type scenario may mean that during display of the first preview interface by the mobile phone (a scenario in which the SUPER MACRO function is not enabled), a distance between a camera and a photographed object is a value greater than d3 cm. In this way, during display of the first preview interface, the mobile phone enables the first camera and displays an image frame captured by the first camera, that is, the image frame captured by the first camera is sent for display. In this period, the mobile phone may obtain a fifth real-time parameter of the first camera based on the image frame captured by the first camera, where the fifth real-time parameter is used to indicate a real-time photographing status of the first camera. When a focusing status in the fifth real-time parameter is that focusing succeeds, and an absolute value of a defocus value in the fifth real-time parameter is less than a second threshold, a predicted object distance 5 indicated by a VCM code value in the fifth real-time parameter is determined. When the predicted object distance 5 is greater than d3 cm, the SUPER MACRO function is not enabled, the first preview interface continues to be displayed, and an image frame captured by the first camera is sent for display in the first preview interface.

For another example, the fourth-type scenario may mean that during display of the third preview interface by the mobile phone (a scenario in which the SUPER MACRO function is enabled), a distance between a camera and a photographed object changes to a value greater than d3 cm. In this way, during display of the third preview interface, the mobile phone enables the second camera and displays an image frame captured by the second camera, that is, the image frame captured by the second camera is sent for display. In addition, the first camera continues to capture an image frame, but the image frame is not sent for display. In this period, the mobile phone may obtain a sixth real-time parameter of the first camera, where the sixth real-time parameter is used to indicate a real-time photographing status of the first camera. When a focusing status in the sixth real-time parameter is that focusing succeeds, and an absolute value of a defocus value in the sixth real-time parameter is less than a second threshold, a predicted object distance 6 indicated by a VCM code value in the sixth real-time parameter is determined. When the predicted object distance 6 is greater than d3 cm, the SUPER MACRO function is disabled, that is, the first preview interface is switched to and displayed, and an image frame captured by the first camera is sent for display in the first preview interface. In addition, a sixth real-time parameter corresponding to the first camera is obtained again after a plurality of image frames captured by the first camera are sent for display in the first preview interface. In the latest obtained sixth real-time parameter, a focusing status is that focusing succeeds, an absolute value of a defocus value is less than the second threshold, and a predicted object distance 7 indicated by a VCM code value is also greater than d3 cm. Then, the second camera is disabled.

In some other embodiments, when it is determined whether to enable the SUPER MACRO function, light information of an environment in which the mobile phone is located needs to be further considered. It may be understood that light in the environment affects a success rate of focusing, that is, affects accuracy of a predicted object distance indicated by a VCM code value. The ambient lighting information may be sensed by a camera sensor in the mobile phone.

When the SUPER MACRO function of the camera application is not enabled, for example, when the mobile phone displays the first preview interface, if the mobile phone detects that the ambient lighting information is not greater than a dark light threshold, the mobile phone determines that the SUPER MACRO function does not need to be used, continues to display the first preview interface, and sends, for display, an image frame captured by the first camera. It may be understood that, the ambient lighting information may be used to indicate intensity of light in an environment in which the mobile phone is located. Generally, smaller ambient lighting information indicates a darker environment in which the mobile phone is located. In addition, larger ambient lighting information indicates a brighter environment in which the mobile phone is located.

If the mobile phone detects that the ambient lighting information is greater than the dark light threshold, the mobile phone continues to determine, based on the focusing status, the defocus value, and the VCM code value that are of the first camera, whether to start the SUPER MACRO function. The dark light threshold may be determined through calibration. For example, an error between a predicted object distance corresponding to a VCM code value and a real photographing distance is tested in a case of different ambient lighting, so that a correspondence between ambient lighting and an error is obtained. Then, ambient lighting with a maximum value is determined from ambient lighting whose error is greater than an error threshold, and the ambient lighting is used as the dark light threshold and is preset in the mobile phone. For example, the dark light threshold may be 5 lux.

Figure 10A:
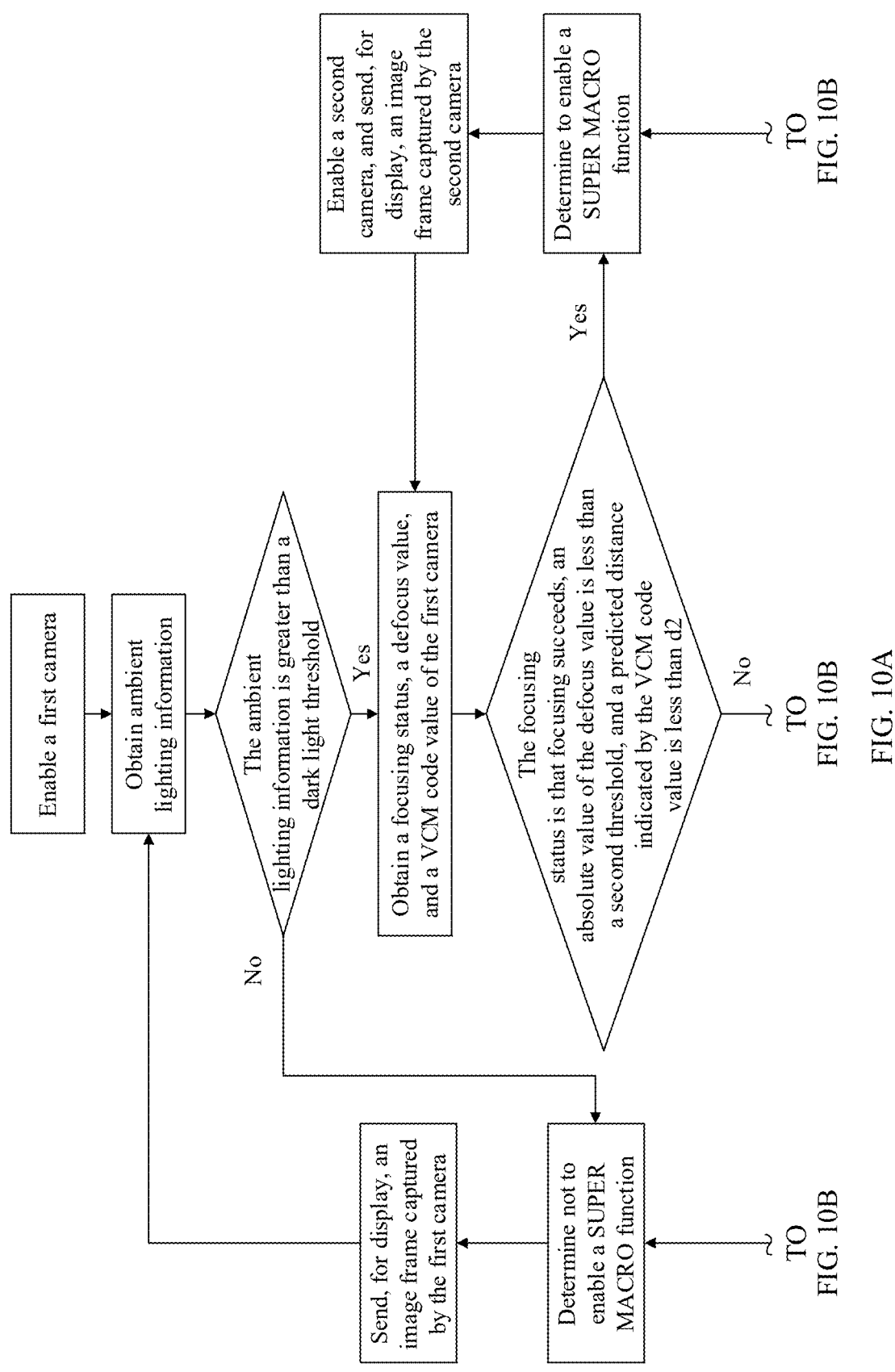

In an implementation, as shown in FIG. 10A, after the mobile phone enables the camera application, the mobile phone enables the first camera. After the first camera is enabled, the first camera may collect corresponding ambient lighting information. The ambient lighting information is used to indicate intensity of light in an environment in which the first camera is located.

The mobile phone may determine whether the ambient lighting information is greater than the dark light threshold. For example, when the ambient lighting information is not greater than the dark light threshold, the mobile phone determines not to enable the SUPER MACRO function, so that the mobile phone can send, for display, an image frame captured by the first camera. Then, new ambient lighting information continues to be obtained based on a next image frame captured by the first camera.

For another example, when the ambient lighting information is greater than the dark light threshold, the mobile phone obtains a focusing status, a defocus value, and a VCM code value that correspond to the first camera, and determines whether the focusing status, the defocus value, and the VCM code value of the first camera meet a condition 1. The condition 1 means the following: The focusing status is that focusing succeeds, an absolute value of the defocus value is less than the second threshold, and a predicted object distance indicated by the VCM code value is less than d2.

If the focusing status, the defocus value, and the VCM code value of the first camera meet the condition 1, the mobile phone determines to enable the SUPER MACRO function. Afterwards, the mobile phone may enable the second camera, switch to display the third preview interface, and send, for display in the third preview interface, an image frame captured by the second camera. Then, the mobile phone continues to obtain again, based on a next image frame captured by the first camera, a focusing status, a defocus value, and a VCM code value that correspond to the first camera.

If the focusing status, the defocus value, and the VCM code value of the first camera do not meet the condition 1, the mobile phone determines whether the focusing status, the defocus value, and the VCM code value of the first camera meet a condition 2. The condition 2 means the following: The focusing status is that focusing fails, and a sum of the defocus value and a lenpos value indicated by the VCM code is less than the first threshold.

If the focusing status, the defocus value, and the VCM code value of the first camera meet the condition 2, the mobile phone determines to enable the SUPER MACRO function. Afterwards, the mobile phone may enable the second camera, switch to display the third preview interface, and send, for display in the third preview interface, an image frame captured by the second camera. Then, the mobile phone obtains again, based on a next image frame captured by the first camera, a focusing status, a defocus value, and a VCM code value that correspond to the first camera.

If the focusing status, the defocus value, and the VCM code value of the first camera do not meet the condition 2, the mobile phone determines whether the focusing status, the defocus value, and the VCM code value of the first camera meet a condition 3. The condition 3 means the following: The focusing status is that focusing succeeds, an absolute value of the defocus value is less than the second threshold, and a predicted object distance indicated by the VCM code value is greater than d3. The condition 3 may also be referred to as a third condition.

If the focusing status, the defocus value, and the VCM code value of the first camera meet the condition 3, the mobile phone determines not to enable the SUPER MACRO function, so that the mobile phone can send, for display, an image frame captured by the first camera. Then, the mobile phone obtains again, based on a next image frame captured by the first camera, the ambient lighting information, and a focusing status, a defocus value, and a VCM code value that correspond to the first camera.

In some other embodiments, when the mobile phone does not enable the SUPER MACRO function, if the ambient lighting information is not greater than dark light threshold, the mobile phone continues not to enable the SUPER MACRO function. When the mobile phone enables the SUPER MACRO function, if the ambient lighting information is not greater than the dark light threshold, the mobile phone continues to enable the SUPER MACRO function. To be specific, when the ambient lighting information is not greater than the dark light threshold, if a user instruction is not received, the mobile phone does not perform a lens switching action.

In some other embodiments, when the SUPER MACRO function of the camera application is not enabled, the mobile phone may determine, based on the focusing status, the defocus value, and the VCM code value of the first camera, whether to enable the SUPER MACRO function. When the SUPER MACRO function of the camera application is enabled, the second camera is started to capture an image frame and sends the image frame for display, and the first camera continues to capture an image frame but does not send the image frame for display. In this scenario, in addition to determining, based on the focusing status, the defocus value, and the VCM code value of the first camera, whether to exit the SUPER MACRO function, the mobile phone may further determine, with reference to a focusing status, a defocus value, and a VCM code value of the second camera, whether to exit the SUPER MACRO function.

Figure 11:
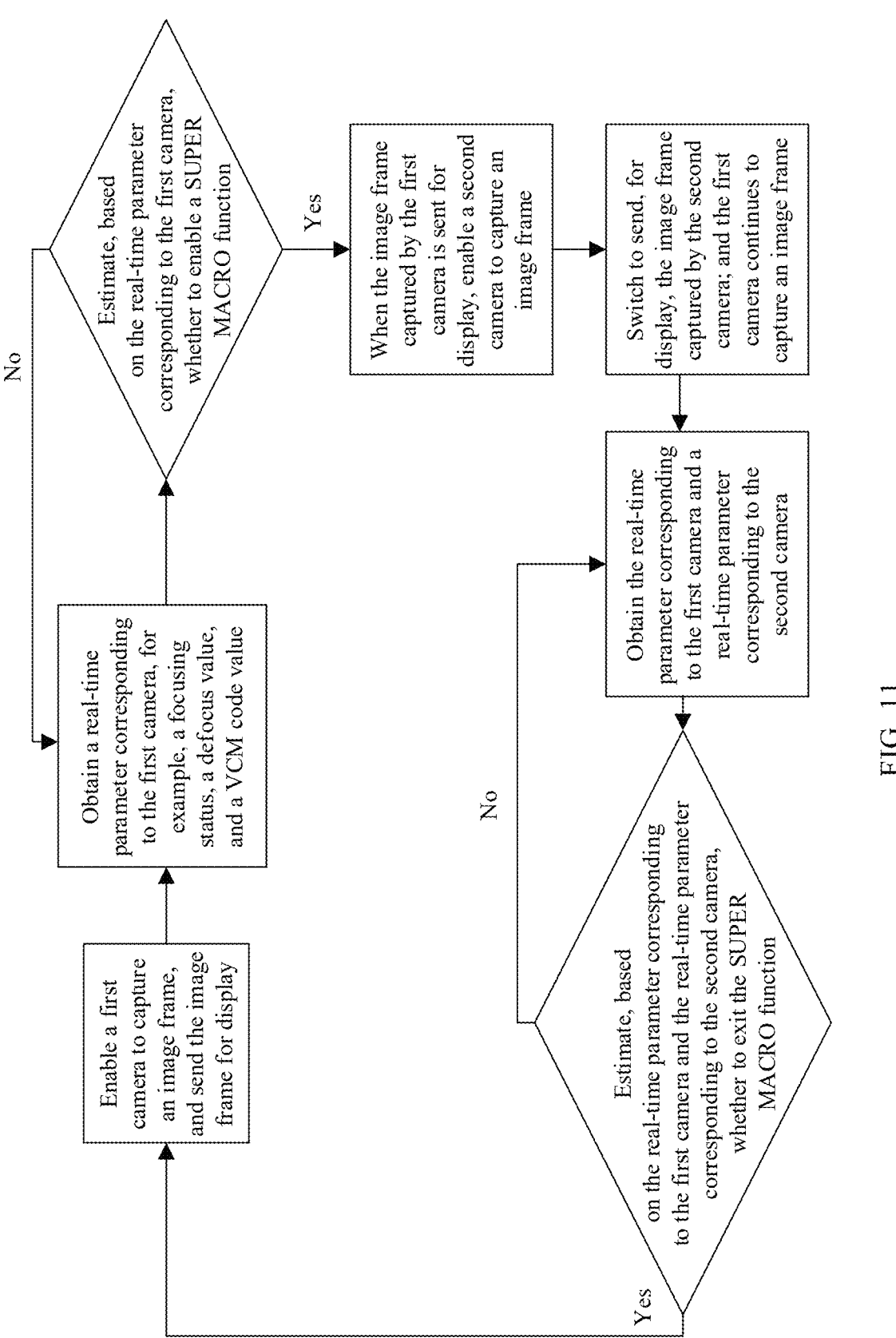
FIG. 11 is a fifth flowchart of a camera switching method according to an embodiment of this application.

In an implementation, as shown in FIG. 11, the mobile phone enables the first camera to capture an image frame, and displays the image frame captured by the first camera, for example, this is referred to as sending for display. Then, the mobile phone obtains a real-time parameter of the first camera, such as a focusing status, a defocus value, and a VCM code value. The mobile phone estimates, based on the focusing status, the defocus value, and the VCM code value of the first camera, whether to enable the SUPER MACRO function. For a process of estimating whether to enable the SUPER MACRO function, refer to the examples of determining whether to enable the SUPER MACRO function in the several types of scenarios in the foregoing embodiment. Details are not described herein again.

When the mobile phone determines not to enable the SUPER MACRO function, the image frame captured by the first camera continues to be sent for display, and the mobile phone also continues to obtain the real-time parameter of the first camera, and determines whether to enable the SUPER MACRO function. This is performed cyclically.

When the mobile phone determines to enable the SUPER MACRO function, the mobile phone starts the second camera while sending, for display, the image frame captured by the first camera, and after the second camera starts to capture an image frame, the mobile phone switches to send, for display, the image frame captured by the second camera. When the image frame captured by the second camera is sent for display, the first camera also continues to capture an image frame. In this way, the mobile phone may obtain the real-time parameter corresponding to the first camera and a real-time parameter corresponding to the second camera. The real-time parameter corresponding to the second camera may also include the focusing status, the defocus value, and the VCM code value of the second camera. In addition, both the focusing status and the defocus value of the second camera may be obtained through calculation based on the image frame captured by the second camera. For details, refer to a manner of obtaining the focusing status and the defocus value of the first camera in the foregoing embodiment. Details are not described herein again. The VCM code value of the second camera may be read from a VCM in the second camera.

After obtaining the real-time parameters corresponding to the first camera and the second camera, the mobile phone may estimate, based on the real-time parameter corresponding to the first camera and the real-time parameter corresponding to the second camera, whether to exit the SUPER MACRO function. If an estimation result is that the mobile phone needs to exit the SUPER MACRO function, the mobile phone sends, for display again, the image frame captured by the first camera, and disables the second camera. If the estimation result is that the mobile phone does not need to exit the SUPER MACRO function, the mobile phone obtains again, based on a next image frame captured by the first camera, the real-time parameter corresponding to the first camera; obtains again, based on a next image frame captured by the second camera, the real-time parameter corresponding to the second camera; and repeatedly performs determining This is performed cyclically.

Figure 12A:
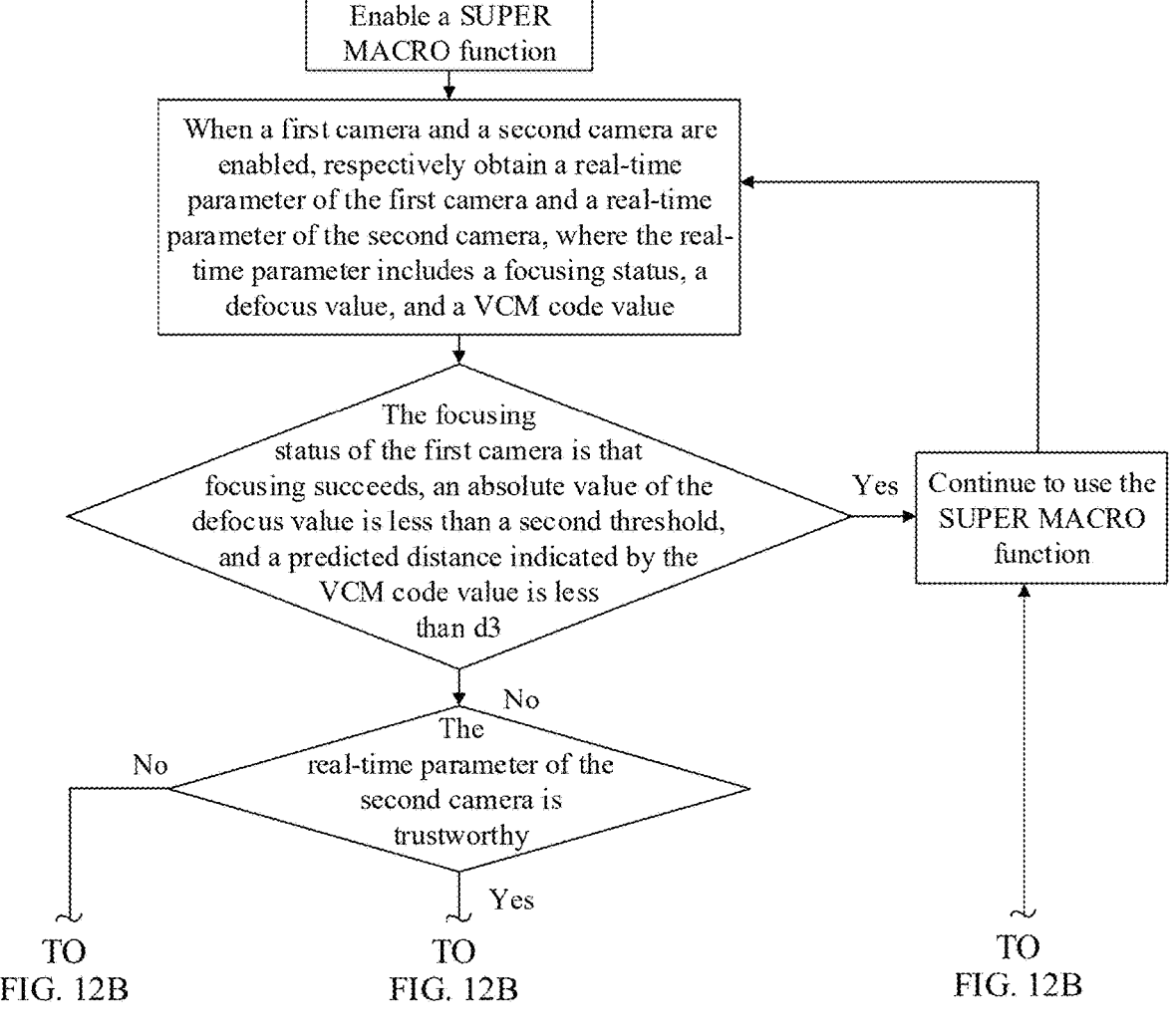
FIG. 12A and FIG. 12B are a sixth flowchart of a camera switching method according to an embodiment of this application.
Figure 12B:
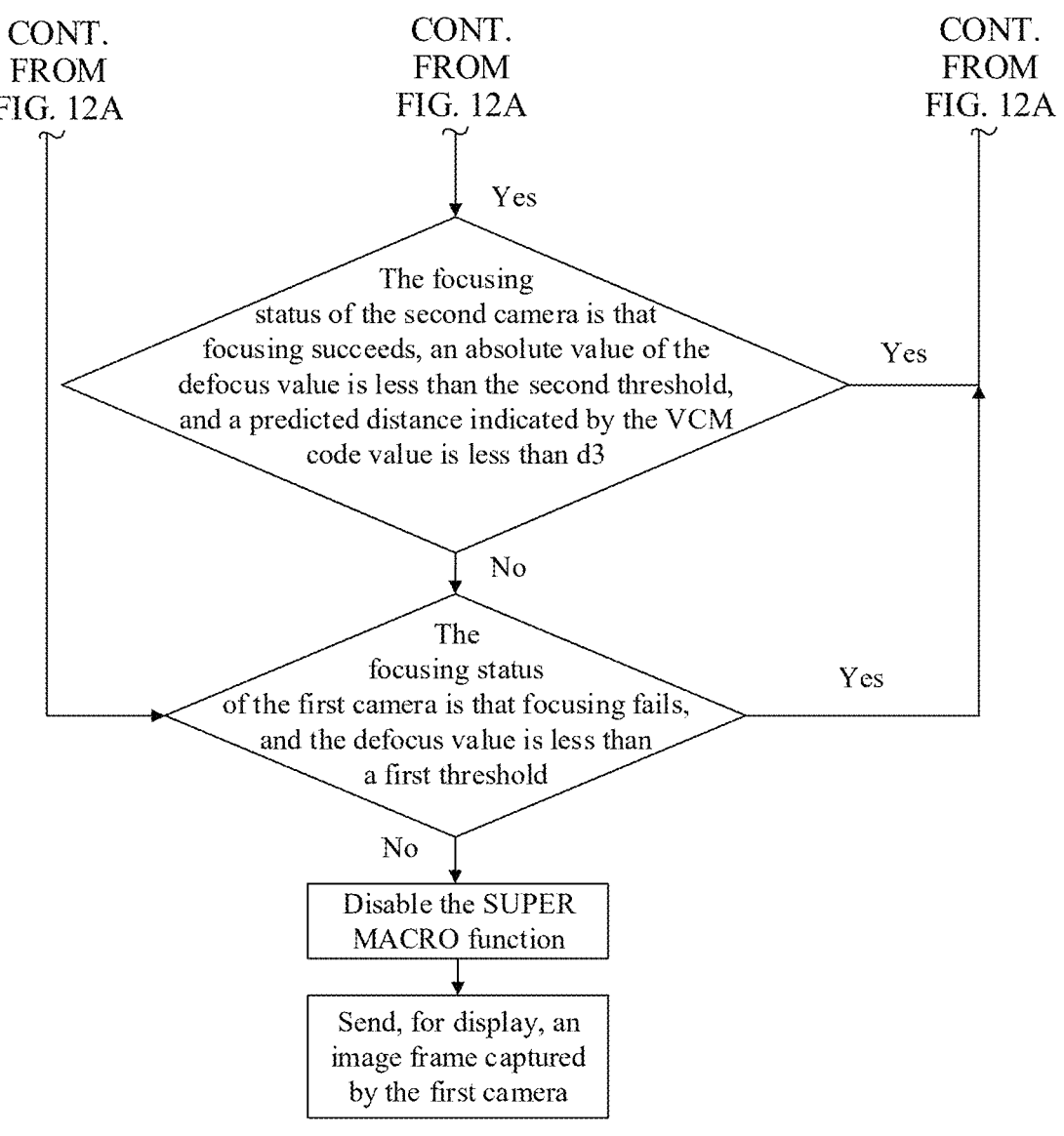

In an embodiment, as shown in FIG. 12A and FIG. 12B, the foregoing process of estimating, based on the real-time parameter corresponding to the first camera and the real-time parameter corresponding to the second camera, whether to exit the SUPER MACRO function is as follows.

When the SUPER MACRO function of the camera application is enabled, that is, when the mobile phone displays the third preview interface, both the first camera and the second camera are enabled, and respectively capture image frames. In this scenario, the mobile phone sends, for display in the third preview interface, the image frame captured by the second camera.

When the first camera and the second camera are enabled, the real-time parameter of the first camera and the real-time parameter of the second camera are respectively obtained, where the real-time parameter includes a focusing status, a defocus value, and a VCM code value. For example, the mobile phone may obtain a group of focusing status, defocus value, and VCM code value based on the image frame captured by the first camera, and the mobile phone may also obtain a group of focusing status, defocus value, and VCM code value based on each image frame captured by the second camera.

Each time obtaining a group of focusing status, defocus value, and VCM code value of the first camera, the mobile phone can determine whether the focusing status, the defocus value, and the VCM code value of the first camera meet a condition 4. The condition 4 means the following: The focusing status of the first camera is that focusing succeeds, an absolute value of the defocus value is less than the second threshold, and a predicted object distance indicated by the VCM code value is less than d3.

If the focusing status, the defocus value, and the VCM code value of the first camera meet the condition 4, the mobile phone determines to continue to use the SUPER MACRO function. In this way, as shown in FIG. 12A, the mobile phone may obtain, based on next image frames captured by the first camera and the second camera, a focusing status, a defocus value, and a VCM code value that correspond to the first camera, and a focusing status, a defocus value, and a VCM code value that correspond to the second camera.

If the focusing status, the defocus value, and the VCM code value of the first camera do not meet the condition 4, the mobile phone determines whether the real-time parameter of the second camera is trustworthy. In an implementation, the second camera may be pre-measured to determine whether there is a linear correspondence between the VCM code value of the second camera and an actual photographing distance. When it is determined that the linear correspondence exists, an identifier 1 indicating that the second camera is trustworthy may be written at a specified storage location of the mobile phone. In this way, when finding that the specified storage location stores the identifier 1, the mobile phone determines that the real-time parameter of the second camera is trustworthy. When finding that the specified storage location does not store the identifier 1, the mobile phone may view module information of the second camera. When the module information of the second camera indicates that the second camera is a fixed-focus module or an open-loop module, the mobile phone determines that the real-time parameter of the second camera is untrustworthy.

When determining that the real-time parameter of the second camera is trustworthy, the mobile phone determines whether the focusing status, the defocus value, and the VCM code value of the second camera meet a condition 5, which is also referred to as a fourth condition. The condition 5 means the following: The focusing status of the second camera is that focusing succeeds, an absolute value of the defocus value is less than the second threshold, and a predicted object distance indicated by the VCM code value is less than d3.

It may be understood that, the mobile phone further includes a correspondence 2. The correspondence 2 is used to indicate an association between the VCM code value of the second camera and an actual photographing distance, and the correspondence 2 may also be obtained by performing a calibration test on the second camera in advance. In this way, the mobile phone queries a matched photographing distance from the correspondence 2 based on the VCM code value in the real-time parameter of the second camera, and uses the matched photographing distance as a corresponding predicted object distance.

If the focusing status, the defocus value, and the VCM code value of the second camera meet the condition 5, the mobile phone determines to continue to use the SUPER MACRO function of the camera application, that is, the mobile phone continues to display the third preview interface, and sends, for display, the image frame captured by the second camera.

If the focusing status, the defocus value, and the VCM code value of the second camera do not meet the condition 5, the mobile phone determines whether the focusing status, the defocus value, and the VCM code value of the first camera meet the condition 2. If the condition 2 is met, the SUPER MACRO function continues to be used; or if condition 2 is not met, the SUPER MACRO function is disabled. After disabling the SUPER MACRO function, the mobile phone switches to display the first preview interface, and sends, for display in the first preview interface, the image frame captured by the first camera. After switching to display the first preview interface, the mobile phone does not disable the second camera immediately. In this way, the mobile phone can continue to obtain corresponding real-time parameters based on next image frames captured by the second camera and the first camera, and determine, based on the foregoing process, whether the SUPER MACRO function needs to be re-enabled. If the mobile phone determines, for a plurality of consecutive times, that the SUPER MACRO function does not need to be enabled, the mobile phone disables the second camera.

In another possible embodiment, when the focusing status, the defocus value, and the VCM code value of the first camera do not meet the condition 4, the mobile phone directly determines whether the focusing status, the defocus value, and the VCM code value of the second camera meet the condition 5.

In some embodiments, the mobile phone may obtain a corresponding real-time parameter based on each image frame captured by a camera (the first camera and the second camera). The mobile phone may further determine, based on the real-time parameter corresponding to each image frame, whether to enable the SUPER MACRO function. For a specific process, refer to the foregoing embodiment. When the camera continuously captures an image frame, each time an image frame is captured, the mobile phone can determine once whether to enable the SUPER MACRO function.

Figure 13:
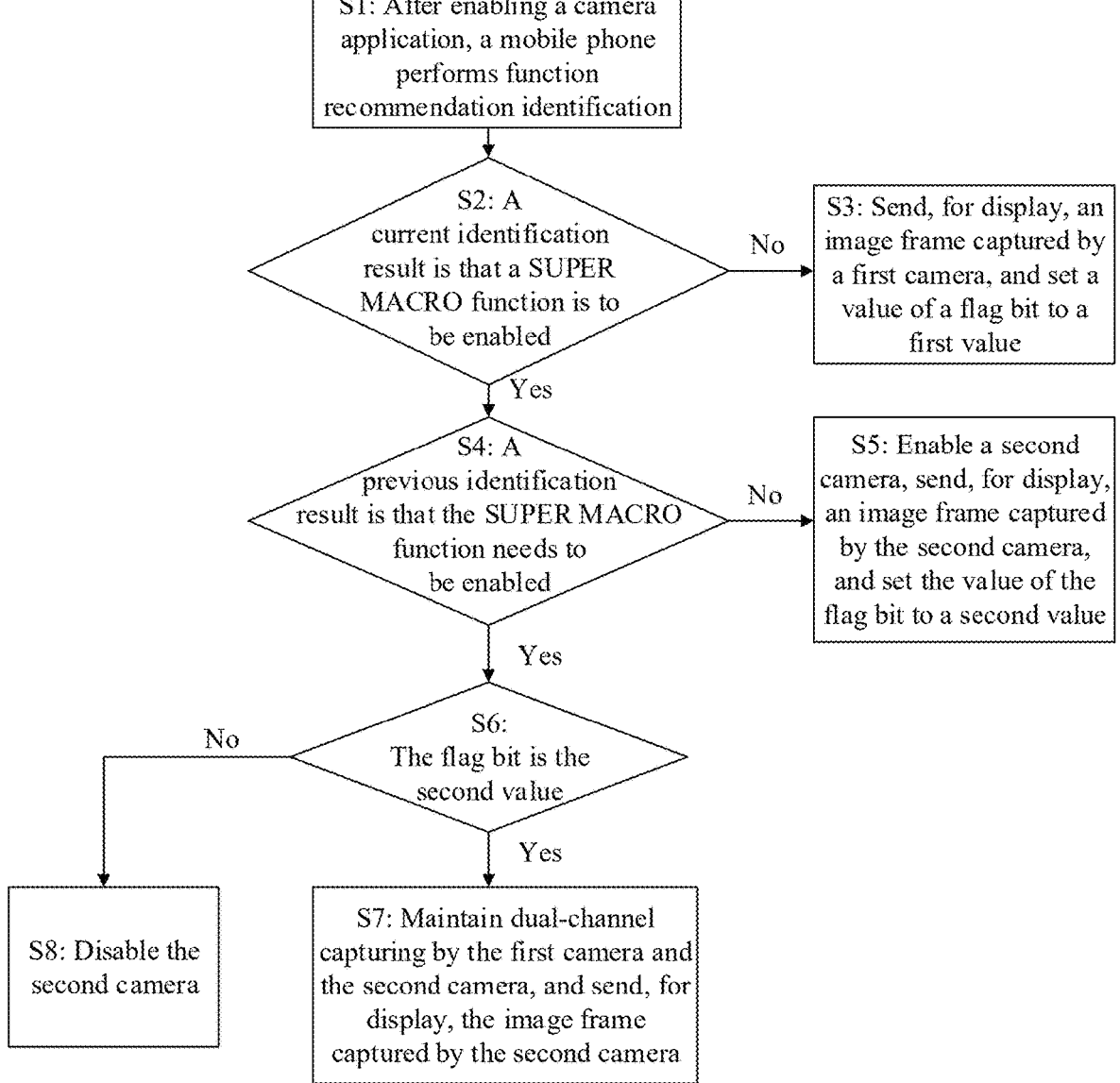
FIG. 13 is a seventh flowchart of a camera switching method according to an embodiment of this application.

In an implementation, as shown in FIG. 13, the foregoing method may further include the following steps.

S1: After enabling the camera application, the mobile phone performs function recommendation identification.

In some embodiments, the foregoing function recommendation identification means that the mobile phone identifies whether the SUPER MACRO function needs to be enabled in a case of a current photographing distance. For example, each time the first camera captures an image frame, the mobile phone is triggered to perform identification once. For an identification process, refer to the foregoing embodiment. Details are not described herein again. In this way, each image frame captured by the first camera corresponds to an identification result. For example, the identification result is that the SUPER MACRO function is to be enabled, or the identification result is that the SUPER MACRO function is not to be enabled. In addition, a sequence exists between different identification results, and the sequence is related to a sequence of capturing image frames. For example, an $n^{th}$ image frame corresponds to an $n^{th}$ identification result, an $(n-1)^{th}$ image frame corresponds to an $(n-1)^{th}$ identification result, and an $(n+1)^{th}$ image frame corresponds to an $(n+1)^{th}$ identification result. The $(n-1)^{th}$ identification result, the $n^{th}$ identification result, and the $(n+1)^{th}$ identification result are sorted in sequence.

S2: The mobile phone determines whether a current identification result is that the SUPER MACRO function is to be enabled.

In some examples, each time an identification result is obtained in S1, the procedure proceeds to S2. The following provides description by using an example in which the current function recommendation identification is triggered by the $n^{th}$ image frame. In this way, the $n^{th}$ identification result is the current identification result.

If the current identification result is that the SUPER MACRO function is not to be enabled, the procedure proceeds to S3; or if the current identification result is that the SUPER MACRO function is to be enabled, the procedure proceeds to S4.

S3: The mobile phone sends, for display, an image frame captured by the first camera, and sets a value of a flag bit to a first value.

In some embodiments, the flag bit is a specific storage location accessible by the camera application, and when the value of the flag bit is the first value, the flag bit is used to indicate that currently the mobile phone actually does not enable the SUPER MACRO function. For example, the first value may be ZOOM_STOPED.

S4: The mobile phone determines whether a previous identification result is that the SUPER MACRO function needs to be enabled.

In some embodiments, if the current identification result is the $n^{th}$ identification result, the previous identification result is the $(n-1)^{th}$ identification result, and a next identification result is the $(n+1)^{th}$ identification result.

It may be understood that, the mobile phone may record a result of each time identifying whether the SUPER MACRO function is to be enabled. In this way, it is convenient for the mobile phone to query a corresponding previous identification result. In addition, in a scenario in which the mobile phone performs function recommendation identification for the first time, for example, when a first frame captured by the first camera triggers the mobile phone to perform function recommendation identification, the mobile phone cannot find the previous identification result. In this case, it can be considered by default that the previous identification result is that the SUPER MACRO function is not to be enabled.

In some embodiments, if the previous identification result is that the SUPER MACRO function is not to be enabled, the procedure proceeds to S5; or if the previous identification result is that the SUPER MACRO function is to be enabled, the procedure proceeds to S6.

S5: The mobile phone enables the second camera, sends, for display, an image frame captured by the second camera, and sets the value of the flag bit to a second value.

In some embodiments, when the value of the flag bit is the second value, the flag bit is used to indicate that currently the SUPER MACRO function is actually enabled. For example, the second value may be ZOOM_INGMACRO.

S6: The mobile phone determines whether the flag bit is the second value.

In some embodiments, if the flag bit is the second value, the procedure proceeds to S7.

In some embodiments, the first camera captures an image frame very quickly, and an identification result is also updated quickly. When the identification result is quickly updated, the value of the flag bit is based on a latest identification result. Generally, before the mobile phone performs S6 based on the $n^{th}$ identification result, the mobile phone obtains the $(n+1)^{th}$ identification result, and changes the value of the flag bit based on the $(n+1)^{th}$ identification result.

In this way, there is a scenario in which both the $n^{th}$ identification result and the $(n-1)^{th}$ identification result are that the SUPER MACRO function needs to be enabled. In this case, the mobile phone actually enables the SUPER MACRO function, and the value of the flag bit is the second value. Based on the $n^{th}$ identification result, the procedure may proceed to S6 according to FIG. 13. However, before the procedure proceeds to S6, if the mobile phone obtains the $(n+1)^{th}$ identification result, and the $(n+1)^{th}$ identification result indicates that the SUPER MACRO function is not to be enabled, the mobile phone correspondingly updates the flag bit to the first value. After the procedure proceeds to S6, a case in which the flag bit is the first value may occur. In this case, the procedure can proceed to S8.

In addition, a user may also manually exit the SUPER MACRO function. In this way, there is a scenario in which both the $n^{th}$ identification result and the $(n-1)^{th}$ identification result are that the SUPER MACRO function needs to be enabled. In this case, the mobile phone actually enables the SUPER MACRO function, and the value of the flag bit is the second value. Based on the $n^{th}$ identification result, the procedure may proceed to S6 according to FIG. 13. However, before the procedure proceeds to S6, if the mobile phone receives an operation that the user indicates to exit the SUPER MACRO function, the mobile phone may immediately exit the SUPER MACRO function, and set the value of the flag bit to the first value. After the procedure proceeds to S6, a case in which the flag bit is the first value may also occur. In this case, the procedure can proceed to S8. In addition, after the mobile phone receives the operation that the user indicates to exit the SUPER MACRO function, function recommendation identification may be suspended until the mobile phone re-enables the camera application.

S7: The mobile phone maintains dual-channel capturing by the first camera and the second camera, and sends, for display, the image frame captured by the second camera.

In some embodiments, during enabling of the SUPER MACRO function, although only the image frame captured by the second camera is sent for display, the first camera continues to capture an image frame. In this way, the mobile phone identifies a change in an actual photographing distance between the camera and a photographed object in a timely manner based on the image frame captured by the first camera, and determines, in a timely manner, whether to exit the SUPER MACRO function, that is, switches to send, for display, the image frame captured by the first camera.

S8: The mobile phone disables the second camera.

In some embodiments, the mobile phone may disable the second camera when the first camera stably captures a plurality of image frames, and all the image frames trigger the mobile phone to identify that the SUPER MACRO function needs to be enabled, to avoid repeatedly enabling and disabling the second camera while total energy consumption of the mobile phone is reduced.

Figure 14:
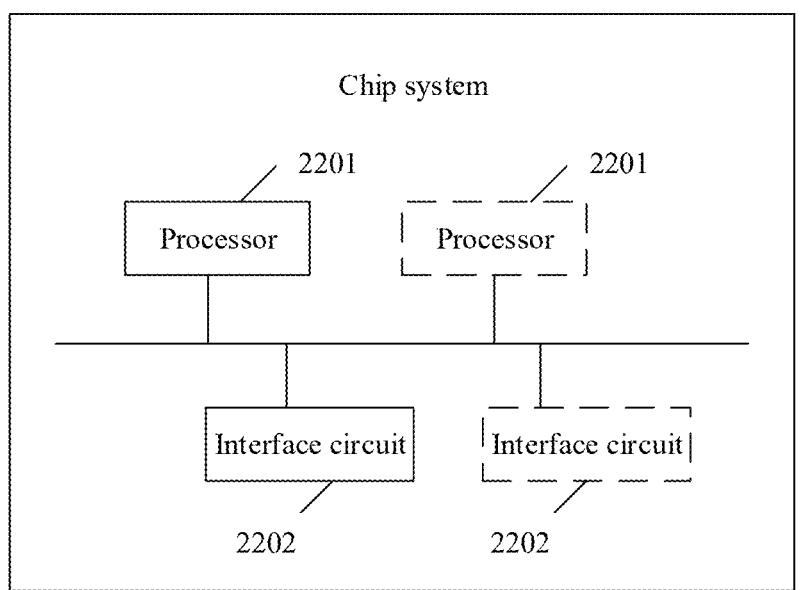
FIG. 14 is a schematic diagram of composition of a chip system according to an embodiment of this application.

An embodiment of this application further provides a chip system, and the chip system may be applied to the electronic device in the foregoing embodiment. As shown in FIG. 14, the chip system includes at least one processor 2201 and at least one interface circuit 2202. The processor 2201 may be the processor in the electronic device. The processor 2201 and the interface circuit 2202 may be interconnected through a line. The processor 2201 may receive computer instructions from the memory of the electronic device by using the interface circuit 2202 and execute the computer instructions. When the computer instructions are executed by the processor 2201, the electronic device is enabled to perform the steps in the foregoing embodiment. Certainly, the chip system may further include another discrete component. This is not specifically limited in this embodiment of this application.

In some embodiments, it may be clearly understood by a person skilled in the art through descriptions of the foregoing implementations that, for ease and brevity of description, division of the foregoing functional modules is merely used as an example for description. In actual application, the foregoing functions may be allocated to different functional modules for completion based on a requirement, that is, an internal structure of the apparatus is divided into different functional modules to complete all or some of the functions described above. For a specific working process of the system, the apparatus, and the unit described above, refer to a corresponding process in the foregoing method embodiments. Details are not described herein again.

In the embodiments of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A camera switching method, applied to an electronic device, wherein the electronic device comprises a first camera and a second camera, and the method comprises:

receiving, by the electronic device, a first operation of a user;

in a scenario in which a photographing distance between the electronic device and a photographed object is less than a first value, displaying, by the electronic device, a first interface in response to the first operation, wherein the first interface is a preview framing interface used by the electronic device for photographing, the first interface is used to display an image frame captured by the first camera, and the first value is a minimum focusing distance of the first camera; and displaying, by the electronic device, a second interface when the electronic device determines that a first condition is met, wherein the second interface is a preview framing interface used by the electronic device for photographing, the second interface is used to display an image frame captured by the second camera, and a minimum focusing distance of the second camera is less than the first value, wherein the first condition comprises: a focusing status of the first camera is that focusing fails, and a sum of a defocus value of the first camera and a corresponding second value is less than a preset first threshold, wherein the second value is used to indicate a focus adjustment location of a lens in the first camera.

2. The camera switching method according to claim 1, wherein the method further comprises:

determining, during display of the second interface by the electronic device, that a second condition is met, wherein the second condition comprises: the focusing status of the first camera is that focusing succeeds, and an absolute defocus value of the first camera is less than a preset second threshold;

determining, by the electronic device, a predicted object distance corresponding to a voice coil motor (VCM) code of the first camera; and when the predicted object distance is not less than the first value and is less than a third value, continuing, by the electronic device, to display the second interface, wherein the third value is a preset value.

3. The camera switching method according to claim 1, wherein the method further comprises:

determining, during display of the second interface by the electronic device, that a second condition is met, wherein the second condition comprises: the focusing status of the first camera is that focusing succeeds, and an absolute defocus value of the first camera is less than a preset second threshold;

determining, by the electronic device, a predicted object distance corresponding to a voice coil motor (VCM) code of the first camera; and when the predicted object distance is greater than a third value, switching, by the electronic device, to display the first interface, wherein the third value is a preset value.

4. The camera switching method according to claim 3, wherein after the switching, by the electronic device, to display the first interface, the method further comprises:

disabling, by the electronic device, the second camera.

5. The camera switching method according to claim 3, wherein the method further comprises:

determining, during display of the first interface by the electronic device, that the second condition is met;

determining, by the electronic device, the predicted object distance corresponding to the VCM code of the first camera; and when the predicted object distance is not less than a fourth value and is less than the third value, continuing, by the electronic device, to display the first interface, wherein the fourth value is a preset value greater than the first value.

6. The camera switching method according to claim 5, wherein the method further comprises:

determining, during display of the first interface by the electronic device, that the second condition is met;

determining, by the electronic device, the predicted object distance corresponding to the VCM code of the first camera; and when the predicted object distance is less than the fourth value, switching, by the electronic device, to display the second interface.

7. The camera switching method according to claim 1, wherein before the displaying the second interface, the method further comprises:

collecting, by the electronic device, ambient lighting information; and determining, by the electronic device, that the ambient lighting information is greater than a preset dark light threshold.

8. The camera switching method according to claim 1, wherein the second interface comprises a first identifier, the first identifier is used to remind that an image frame in the second interface is captured by the second camera, and the method further comprises:

receiving, by the electronic device during display of the second interface, a second operation performed by the user on the first identifier; and switching, by the electronic device in response to the second operation, to display the first interface.

9. The camera switching method according to claim 1, wherein the method further comprises:

determining, during display of the second interface by the electronic device, that a third condition is not met, wherein the third condition comprises: the focusing status of the first camera is that focusing succeeds, an absolute defocus value of the first camera is less than a preset second threshold, and a predicted object distance corresponding to a voice coil motor (VCM) code of the first camera is less than a third value, wherein the third value is a preset value;

determining, by the electronic device, that a fourth condition is met, wherein the fourth condition comprises: a focusing status of the second camera is that focusing succeeds, an absolute defocus value of the second camera is less than the preset second threshold, and a predicted object distance corresponding to a VCM code of the second camera is less than the third value; and continuing, by the electronic device, to display the second interface.

10. The camera switching method according to claim 9, wherein before the determining, by the electronic device, that a fourth condition is met, the method further comprises:

determining, by the electronic device, that the VCM code of the second camera is trustworthy, wherein a case in which the VCM code of the second camera is trustworthy comprises any one of the following:

the second camera is pre-marked with a trusted identifier; and module information of the second camera indicates that the second camera is not a fixed-focus module and is not an open-loop module.

11. The camera switching method according to claim 1, wherein before the displaying, by the electronic device, a second interface, the method further comprises: enabling, by the electronic device, the second camera.

12. An electronic device, comprising:

a first camera;

a second camera;

one or more processors; and memory coupled to the processor, wherein the memory stores computer program code, the computer program code comprises computer instructions, and when the one or more processors execute the computer instructions, the electronic device is enabled to:

receive a first operation of a user;

in a scenario in which a photographing distance between the electronic device and a photographed object is less than a first value, display a first interface in response to the first operation, wherein the first interface is a preview framing interface used by the electronic device for photographing, the first interface is used to display an image frame captured by the first camera, and the first value is a minimum focusing distance of the first camera; and display a second interface when the electronic device determines that a first condition is met, wherein the second interface is a preview framing interface used by the electronic device for photographing, the second interface is used to display an image frame captured by the second camera, and a minimum focusing distance of the second camera is less than the first value, wherein the first condition comprises: a focusing status of the first camera is that focusing fails, and a sum of a defocus value of the first camera and a corresponding second value is less than a preset first threshold, wherein the second value is used to indicate a focus adjustment location of a lens in the first camera.

13. The electronic device according to claim 12, wherein when the one or more processors execute the computer instructions, the electronic device is enabled to:

determine, during display of the second interface by the electronic device, that a second condition is met, wherein the second condition comprises: the focusing status of the first camera is that focusing succeeds, and an absolute defocus value of the first camera is less than a preset second threshold;

determine a predicted object distance corresponding to a voice coil motor (VCM) code of the first camera; and when the predicted object distance is not less than the first value and is less than a third value, continue to display the second interface, wherein the third value is a preset value.

14. The electronic device according to claim 12, wherein when the one or more processors execute the computer instructions, the electronic device is enabled to:

determine, during display of the second interface by the electronic device, that a second condition is met, wherein the second condition comprises: the focusing status of the first camera is that focusing succeeds, and an absolute defocus value of the first camera is less than a preset second threshold;

determine a predicted object distance corresponding to a voice coil motor (VCM) code of the first camera; and when the predicted object distance is greater than a third value, switch to display the first interface, wherein the third value is a preset value.

15. The electronic device according to claim 14, wherein when the one or more processors execute the computer instructions, the electronic device is enabled to:

after switching to display the first interface, disable the second camera.

16. The electronic device according to claim 14, wherein when the one or more processors execute the computer instructions, the electronic device is enabled to:

determine, during display of the first interface by the electronic device, that the second condition is met;

determine the predicted object distance corresponding to the VCM code of the first camera; and when the predicted object distance is not less than a fourth value and is less than the third value, continue to display the first interface, wherein the fourth value is a preset value greater than the first value.

17. A non-transitory computer readable storage medium storing instructions that are executable by at least one processor, wherein when the instructions are executed by the at least one processor, an electronic device is enabled to:

receive a first operation of a user;

in a scenario in which a photographing distance between the electronic device and a photographed object is less than a first value, display a first interface in response to the first operation, wherein the first interface is a preview framing interface used by the electronic device for photographing, the first interface is used to display an image frame captured by a first camera of the electronic device, and the first value is a minimum focusing distance of the first camera; and display a second interface when the electronic device determines that a first condition is met, wherein the second interface is a preview framing interface used by the electronic device for photographing, the second interface is used to display an image frame captured by a second camera of the electronic device, and a minimum focusing distance of the second camera is less than the first value, wherein the first condition comprises: a focusing status of the first camera is that focusing fails, and a sum of a defocus value of the first camera and a corresponding second value is less than a preset first threshold, wherein the second value is used to indicate a focus adjustment location of a lens in the first camera.

18. The non-transitory computer readable storage medium according to claim 17, wherein when the instructions are executed by the at least one processor, the electronic device is enabled to:

determine, during display of the second interface by the electronic device, that a second condition is met, wherein the second condition comprises: the focusing status of the first camera is that focusing succeeds, and an absolute defocus value of the first camera is less than a preset second threshold;

determine a predicted object distance corresponding to a voice coil motor (VCM) code of the first camera; and when the predicted object distance is not less than the first value and is less than a third value, continue to display the second interface, wherein the third value is a preset value.

19. The non-transitory computer readable storage medium according to claim 17, wherein when the instructions are executed by the at least one processor, the electronic device is enabled to:

determine, during display of the second interface by the electronic device, that a second condition is met, wherein the second condition comprises: the focusing status of the first camera is that focusing succeeds, and an absolute defocus value of the first camera is less than a preset second threshold;

determine a predicted object distance corresponding to a voice coil motor (VCM) code of the first camera; and when the predicted object distance is greater than a third value, switch to display the first interface, wherein the third value is a preset value.

20. The non-transitory computer readable storage medium according to claim 17, wherein when the instructions are executed by the at least one processor, the electronic device is enabled to:

after switching to display the first interface, disable the second camera.

* * * * *